US012095683B2

(12) United States Patent
Takeda et al.

(10) Patent No.: US 12,095,683 B2
(45) Date of Patent: Sep. 17, 2024

(54) USER TERMINAL

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 405 days.

(21) Appl. No.: 17/431,093

(22) PCT Filed: Feb. 14, 2019

(86) PCT No.: PCT/JP2019/005321
§ 371 (c)(1),
(2) Date: Aug. 13, 2021

(87) PCT Pub. No.: WO2020/165998
PCT Pub. Date: Aug. 20, 2020

(65) Prior Publication Data
US 2022/0150003 A1    May 12, 2022

(51) Int. Cl.
*H04L 5/00* (2006.01)
*H04L 1/08* (2006.01)
(Continued)

(52) U.S. Cl.
CPC ............. *H04L 5/0012* (2013.01); *H04L 1/08* (2013.01); *H04W 72/0446* (2013.01); *H04W 72/23* (2023.01)

(58) Field of Classification Search
CPC ......... H04B 1/713; H04L 1/08; H04L 1/1864; H04L 1/189; H04L 1/1893; H04L 1/1896;
(Continued)

(56) References Cited

U.S. PATENT DOCUMENTS 10,084,508 B2 * 9/2018 Ahn ...................... H04L 5/0007
10,454,657 B2 * 10/2019 Bhattad ................. H04L 5/0005
(Continued)

FOREIGN PATENT DOCUMENTS

CA      3050548 C  * 12/2021  ........... H04L 1/0067
CN     110868240 A  *  3/2020
(Continued)

OTHER PUBLICATIONS

Vivo, PUSCH enhancements for URLLC, Jan. 21, 2019, 3GPP TSG RAN WG1 Ad-Hoc Meeting 1901, Taipei, Taiwan, Agenda Item: 7.2.6.1.3, Tdoc: R1-1900128 (Year: 2019).*
(Continued)

*Primary Examiner* — Eric Nowlin
(74) *Attorney, Agent, or Firm* — Osha Bergman Watanabe & Burton LLP

(57) ABSTRACT

A user terminal according to one aspect of the present disclosure includes: a receiving section that receives information related to a number of times of repetition of an uplink shared channel or a downlink shared channel; and a control section that controls transmission of the uplink shared channel or reception of the downlink shared channel in a slot later than consecutive slots whose number is equal to the number of times of the repetition when the uplink shared channel or the downlink shared channel is transmitted or received in transmission occasions whose number is equal to the number of times of the repetition.

3 Claims, 16 Drawing Sheets

(51) Int. Cl.
*H04W 72/0446* (2023.01)
*H04W 72/23* (2023.01)

(58) Field of Classification Search
CPC .............. H04L 5/0012; H04L 5/0053; H04W 72/0446; H04W 72/23
See application file for complete search history.

(56) References Cited

U.S. PATENT DOCUMENTS

| | | | | |
|---|---|---|---|---|
| 11,304,219 | B2* | 4/2022 | Fakoorian | H04B 1/713 |
| 11,617,198 | B2* | 3/2023 | Fakoorian | H04W 76/27 |
| | | | | 370/329 |
| 11,659,576 | B2* | 5/2023 | Lin | H04W 72/21 |
| | | | | 370/329 |
| 2017/0134068 | A1* | 5/2017 | Ahn | H04L 5/0007 |
| 2018/0248671 | A1* | 8/2018 | Bhattad | H04W 72/21 |
| 2020/0177233 | A1 | 6/2020 | Kneissl et al. | |
| 2021/0377937 | A1* | 12/2021 | Takeda | H04W 72/20 |
| 2022/0045816 | A1* | 2/2022 | Suzuki | H04L 5/0044 |
| 2022/0191846 | A1* | 6/2022 | Ren | H04L 1/08 |
| 2022/0232639 | A1* | 7/2022 | Wang | H04L 1/1896 |
| 2024/0114516 | A1* | 4/2024 | Ma | H04L 1/1812 |
| 2024/0155616 | A1* | 5/2024 | Ma | H04W 72/21 |

FOREIGN PATENT DOCUMENTS

| | | | | |
|---|---|---|---|---|
| CN | 110326347 | B * | 5/2021 | ........... H04L 1/0067 |
| CN | 113748637 | A * | 12/2021 | ............. H04L 1/189 |
| DE | 112017003821 | T5 * | 4/2019 | ........... H04L 5/0012 |
| EP | 3720220 | A1 * | 10/2020 | ........... H04L 1/0067 |
| EP | 3734887 | A1 * | 11/2020 | ............. H04L 1/189 |
| JP | 2022530508 | A * | 6/2022 | |
| TW | I744485 | B * | 11/2021 | |
| WO | WO-2018063845 | A1 * | 4/2018 | ........... H04L 5/0012 |
| WO | WO-2018160365 | A2 * | 9/2018 | ........... H04L 1/0067 |
| WO | 2019/007933 | A1 | 1/2019 | |
| WO | WO-2020029782 | A1 * | 2/2020 | |
| WO | WO-2020168259 | A3 * | 10/2020 | ............... H04L 1/08 |
| WO | WO-2020221487 | A1 * | 11/2020 | ............. H04L 1/189 |
| WO | WO-2021203218 | A1 * | 10/2021 | ........... H04L 5/0053 |
| WO | WO-2022152242 | A1 * | 7/2022 | ........... H04L 1/0003 |
| WO | WO-2023019541 | A1 * | 2/2023 | |

OTHER PUBLICATIONS

Sony, L1 enhancements on PUSCH for URLLC, Jan. 21, 2019, 3GPP TSg RAN WG1 Ad-Hoc Meeting 1901, Agenda Item: 7.2.6.1.3, Taipei, Taiwan, Tdoc: R1-1900372 (Year: 2019).*
Nokia et al., On PUSCH enhancements for NR URLLC, Jan. 21, 2019, 3GPP TSG RAN WG1 Ad-Hoc Meeting 1901, Agenda Item: 7.2.6.1.3, Taipei, Taiwan, Tdoc: R1-1900929 (Year: 2019).*
Nokia et al., Summary of contributions on potential enhancements for PUSCH for NR URLLC (AI 7.2.6.1.3), Jan. 21, 2019, 3GPP TSG RAN WG1 Ad-Hoc Meeting 1901, Agenda Item: 7.2.6.1.3, Taipei, Taiwan, Tdoc: R1-1903368 (Year: 2019).*
Zhi et al., English Translation of WO 2020029782 A1 Description, Espacenet, https://worldwide.espacenet.com/ (acquired Oct. 18, 2023) (Year: 2020).*
Zhi et al., English Translation of WO 2020029782 A1 Claims, Espacenet, https://worldwide.espacenet.com/ (acquired Oct. 18, 2023) (Year: 2020).*
Huawei et al., PUSCH enhancements for URLLC, Jan. 21, 2019, 3GPP TSG RAN WG1 Ad-Hoc Meeting 1901, Taipei, Taiwan, Agenda Item: 7.2.6.1.3, Tdoc: R1-1900046 (Year: 2019).*
ZTE, Grant-based PUSCH Enhancements for URLLC, Jan. 21, 2019, 3GPP TSG RAN WG1 Ad-Hoc Meeting 1901, Taipei, Taiwan, Agenda Item: 7.2.6.1.3, Tdoc: R1-1900071 (Year: 2019).*
Ericsson, PUSCH Enhancements for NR URLLC, Jan. 21, 2019, 3GPP TSG RAN WG1 Ad-Hoc Meeting 1901, Taipei, Taiwan, Agenda Item: 7.2.6.1.3, Tdoc: R1-1900160 (Year: 2019).*
MediaTek Inc., Enhancements of NR PUSCH for URLLC, Jan. 21, 2019, 3GPP TSG RAN WG1 Ad-Hoc Meeting 1901, Taipei, Taiwan, Agenda Item: 7.2.6.1.3, Tdoc: R1-1900210 (Year: 2019).*
CATT, Discussion on Potential Enhancements to PUSCH, Jan. 21, 2019, 3GPP TSG RAN WG1 Ad-Hoc Meeting 1901, Taipei, Taiwan, Agenda Item: 7.2.6.1.3, Tdoc: R1-1900333 (Year: 2019).*
Sony, L1 enhancements on PUSCH for URLLC, Jan. 21, 2019, 3GPP TSG RAN WG1 Ad-Hoc Meeting 1901, Taipei, Taiwan, Agenda Item: 7.2.6.1.3, Tdoc: R1-1900372 (Year: 2019).*
AT&T, On Frequency Hopping for PUSCH, Jan. 21, 2019, 3GPP TSG RAN WG1 Ad-Hoc Meeting 1901, Taipei, Taiwan, Agenda Item: 7.2.6.1.3, Tdoc: R1-1900439 (Year: 2019).*
Intel Corporation, On PUSCH enhancements for eURLLC, Jan. 21, 2019, 3GPP TSG RAN WG1 Ad-Hoc Meeting 1901, Taipei, Taiwan, Agenda Item: 7.2.6.1.3, Tdoc: R1-1900495 (Year: 2019).*
LG Electronics, PUSCH enhancements for NR URLLC, Jan. 21, 2019, 3GPP TSG RAN WG1 Ad-Hoc Meeting 1901, Taipei, Taiwan, Agenda Item: 7.2.6.1.3, Tdoc: R1-1900593 (Year: 2019).*
Panasonic, On PUSCH enhancements for NR URLLC, Jan. 21, 2019, 3GPP TSG RAN WG1 Ad-Hoc Meeting 1901, Taipei, Taiwan, Agenda Item: 7.2.6.1.3, Tdoc: R1-1900674 (Year: 2019).*
ETRI, Potential enhancements to PUSCH, Jan. 21, 2019, 3GPP TSG RAN WG1 Ad-Hoc Meeting 1901, Taipei, Taiwan, Agenda Item: 7.2.6.1.3, Tdoc: R1-1900688 (Year: 2019).*
InterDigital Inc., On potential PUSCH enhancements for URLLC, Jan. 21, 2019, 3GPP TSG RAN WG1 Ad-Hoc Meeting 1901, Taipei, Taiwan, Agenda Item: 7.2.6.1.3, Tdoc: R1-1900804 (Year: 2019).*
Sharp, Views on potential enhancements to PUSCH for eURLLC, Jan. 21, 2019, 3GPP TSG RAN WG1 Ad-Hoc Meeting 1901, Taipei, Taiwan, Agenda Item: 7.2.6.1.3, Tdoc: R1-1900834 (Year: 2019).*
Motorola Mobility et al., PUSCH enhancement for URLLC, Jan. 21, 2019, 3GPP TSG RAN WG1 Ad-Hoc Meeting 1901, Taipei, Taiwan, Agenda Item: 7.2.6.1.3, Tdoc: R1-1900939 (Year: 2019).*
NTT DOCOMO, INC., Enhancements for URLLC PUSCH, Jan. 21, 2019, 3GPP TSG RAN WG1 Ad-Hoc Meeting 1901, Taipei, Taiwan, Agenda Item: 7.2.6.1.3, Tdoc: R1-1900971 (Year: 2019).*
Nokia, Summary of 7.2.6.1.3 potential enhancements for PUSCH for NR URLLC, Jan. 21, 2019, 3GPP TSG RAN WG1 Ad-Hoc Meeting 1901, Taipei, Taiwan, Agenda Item: 7.2.6.1.3, Tdoc: R1-1901328 (Year: 2019).*
Nokia et al., Summary of offline discussion on 7.2.6.1.3 potential enhancements for PUSCH for NR URLLC, Jan. 21, 2019, 3GPP TSG-RAN WG1 Ad-Hoc Meeting 1901, Taipei, Taiwan, Agenda item: 7.2.6.1.3, Tdoc: R1-1901398 (Year: 2019).*
Nokia et al., Summary of Friday offline discussion on 7.2.6.1.3 potential enhancements for PUSCH for NR URLLC, Jan. 21, 2019, 3GPP TSG-RAN WG1 Ad-Hoc Meeting 1901, Taipei, Taiwan, Agenda item: 7.2.6.1.3, Tdoc: R1-1901449 (Year: 2019).*
International Search Report issued in PCT/JP2019/005321 on May 7, 2019 (1 page).
Written Opinion of the International Searching Authority issued in PCT/JP2019/005321 on May 7, 2019 (4 pages).
NTT DOCOMO, INC.; "Enhancements for URLLC PUSCH"; 3GPP TSG RAN WG1 Ad-Hoc Meeting 1901, R1-1900971; Taipei; Jan. 21-25, 2019 (6 pages).
Huawei, HiSilicon; "PUSCH enhancements for URLLC"; 3GPP TSG RAN WG1 Ad-Hoc Meeting 1901, R1-1900046; Taipei; Jan. 21-25, 2019 (11 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Wilus, Inc., "On PUSCH enhancement for eURLLC", 3GPP TSG RAN WG1 Ad-Hoc Meeting 1901, R1-1901011, Taipei, Taiwan, Jan. 21-25, 2019 (3 pages).
Partial Supplementary European Search Report issued in European Application No. 19915098.8 mailed on Jul. 14, 2022 (12 pages).
Office Action issued in Japanese Application No. 2020-571983 mailed on Dec. 20, 2022 (6 pages).
Extended European Search Report issued in counterpart European Patent Application No. 19915098.8, mailed on Oct. 28, 2022 (13 pages).

(56) References Cited

OTHER PUBLICATIONS

Panasonic; "On PUSCH enhancements for NR URLLC"; 3GPP TSG RAN WG1 Ad-Hoc Meeting 1901, R1-1900674; Taipei, Taiwan; Jan. 21-25, 2019 (5 pages).
Panasonic; "On NR URLLC enhancements for grant-free transmission"; 3GPP TSG RAN WG1 Meeting #95, R1-1812797; Spokane, USA; Nov. 12-16, 2018 (5 pages).
Office Action issued in Russian Application No. 2021125307/07(053467) mailed on May 24, 2022 (10 pages).

* cited by examiner

| PUSCH mapping type | Normal cyclic prefix | | | Extended cyclic prefix | | |
|---|---|---|---|---|---|---|
| | S | L | S+L | S | L | S+L |
| Type A | 0 | {4,...,14} | {4,...,14} | 0 | {4,...,12} | {4,...,12} |
| Type B | {0,...,13} | {1,...,14} | {1,...,14} | {0,...,12} | {1,...,12} | {1,...,12} |

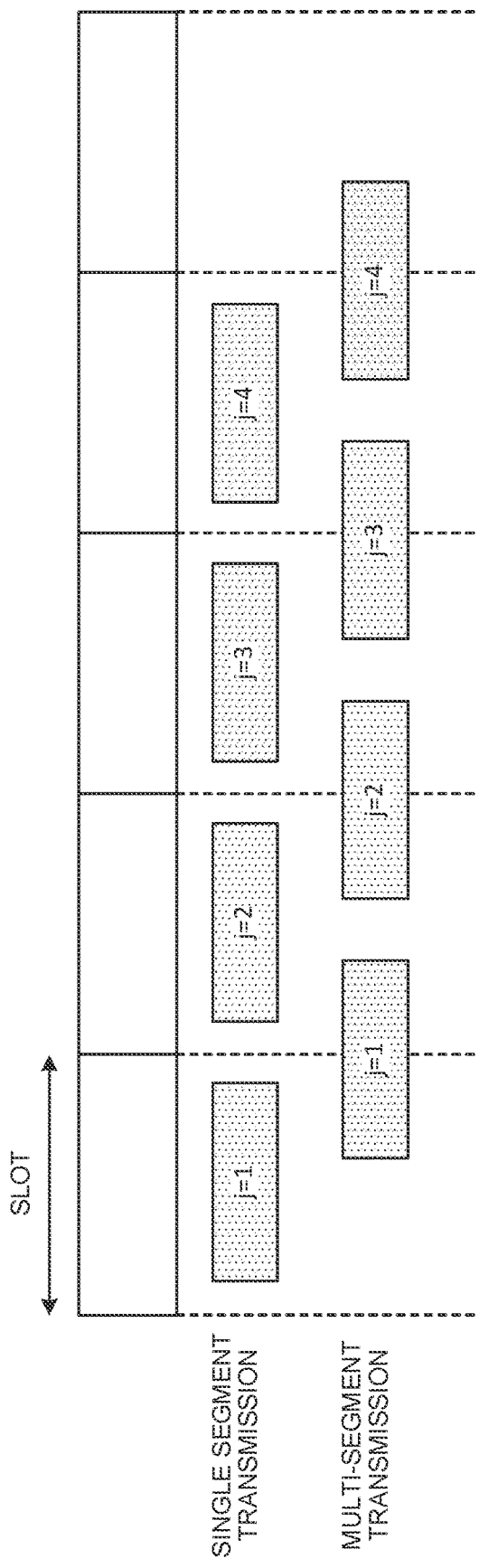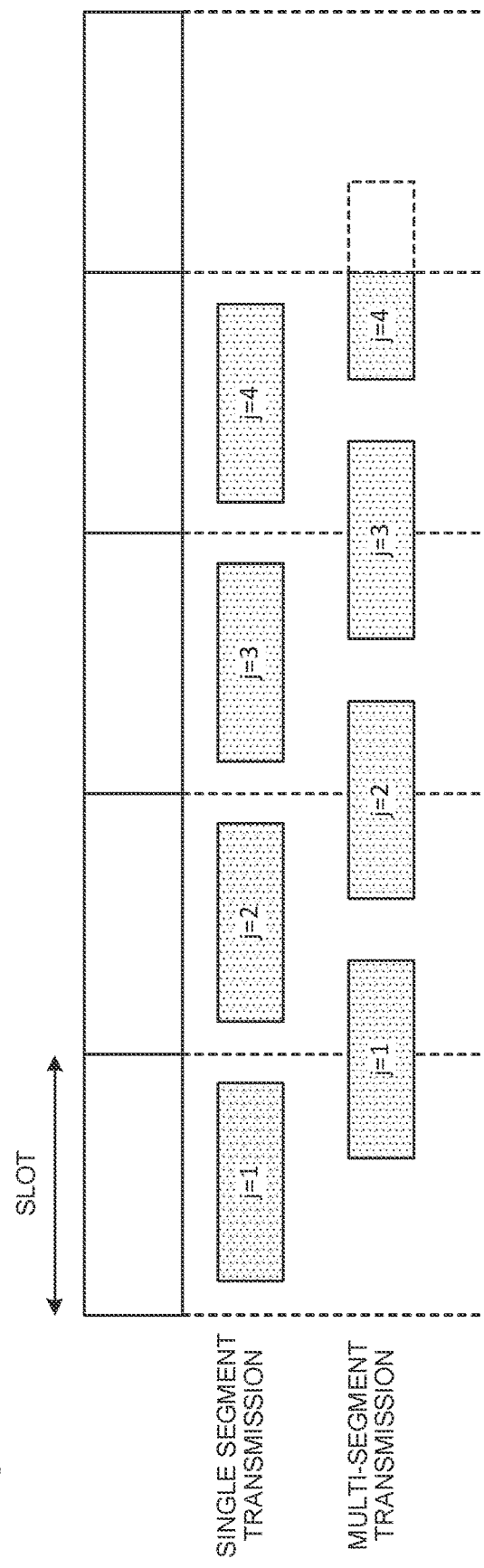

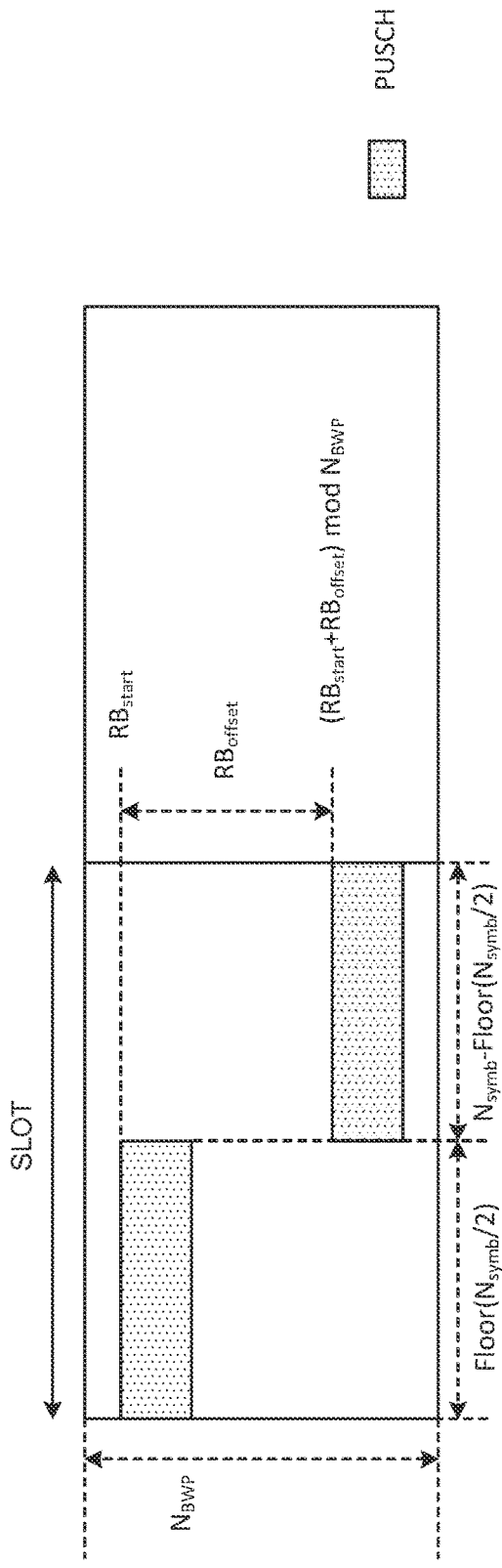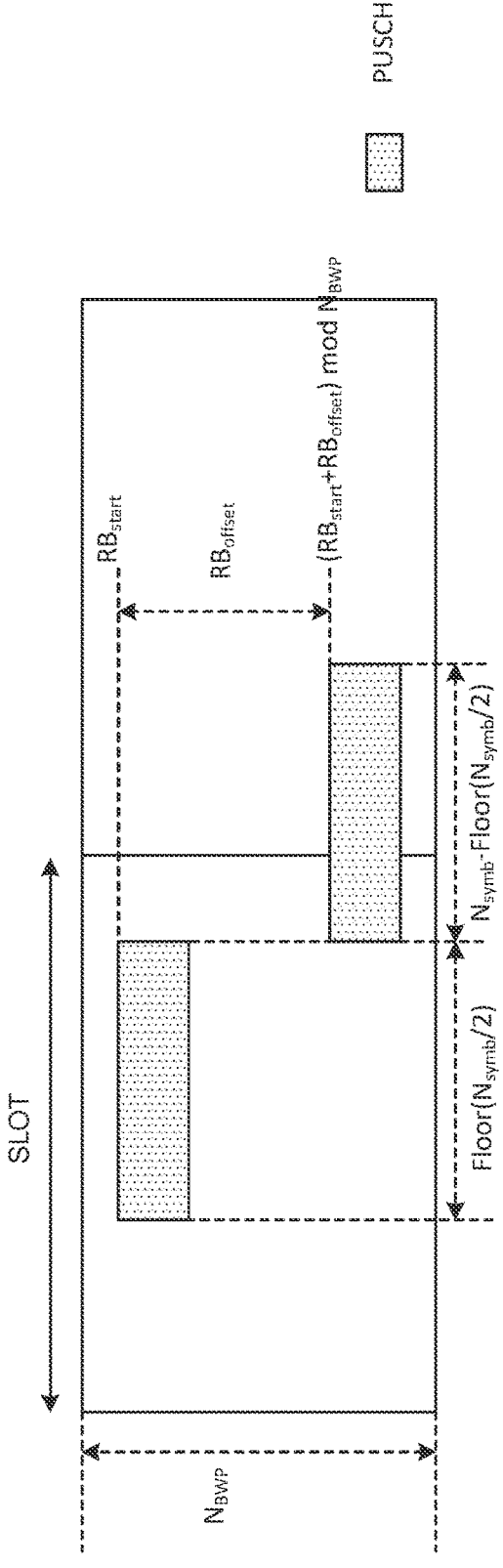

USER TERMINAL

TECHNICAL FIELD

The present disclosure relates to a user terminal in next-generation mobile communication systems.

BACKGROUND ART

In Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G+ (plus)," "New Radio (NR)," "3GPP Rel. 15 (or later versions)," and so on) are also under study.

In existing LTE systems (for example, 3GPP Rel. 8 to Rel. 14), a user terminal (User Equipment (UE)) controls transmission of an uplink shared channel (for example, a Physical Uplink Shared Channel (PUSCH)) and reception of a downlink shared channel (for example, a Physical Downlink Control Channel (PDSCH)), based on downlink control information (DCI).

CITATION LIST

Non-Patent Literature

Non-Patent Literature 1: 3GPP TS 36.300 V8.12.0 "Evolved Universal Terrestrial Radio Access (E-UTRA) and Evolved Universal Terrsestrial Radio Access Network (E-UTRAN); Overall description; Stage 2 (Release 8)," April, 2010

SUMMARY OF INVENTION

Technical Problem

In Rel. 15, the following has been under study: the user terminal (User Equipment (UE)) allocates a time domain resource (for example, a given number of symbols) in a single slot for at least one of a given channel and signal (channel/signal) (for example, an uplink shared channel (Physical Uplink Shared Channel (PUSCH)) or a downlink shared channel (Physical Downlink Shared Channel (PDSCH))) of a given transmission occasion (also referred to as a period, an occasion, or the like).

On the other hand, in future radio communication systems (for example, Rel. 16 or a later version, hereinafter also referred to as NR), it is also assumed that a time domain resource (for example, a given number of symbols) is allocated across a slot boundary (over a plurality of slots) for a given channel/signal (for example, the PUSCH or the PDSCH) of a given transmission occasion.

Transmission of the channel/signal using the time domain resource allocated across the slot boundary (over a plurality of slots) in a given transmission occasion is also referred to as multi-segment transmission, two-segment transmission, cross slot boundary transmission, or the like. In a similar manner, reception of the channel/signal across the slot boundary is also referred to as multi-segment reception, two-segment reception, cross slot boundary reception, or the like.

However, in Rel. 15, control (for example, at least one of determination of the time domain resource, repeated transmission or repeated reception, and frequency hopping) related to at least one of transmission and reception (transmission/reception) of the signal/channel on the premise that the time domain resource is allocated without crossing the slot boundary (within a single slot) in the given transmission occasion is performed. Thus, in NR, the control related to the transmission/reception of the signal/channel to be transmitted by the multi-segment transmission may not be appropriately performed.

In the light of the above, the present disclosure has one object to provide a user terminal that can appropriately control transmission/reception of a signal/channel to be transmitted by multi-segment transmission.

Solution to Problem

A user terminal according to one aspect of the present disclosure includes: a receiving section that receives information related to a number of times of repetition of an uplink shared channel or a downlink shared channel; and a control section that controls transmission of the uplink shared channel or reception of the downlink shared channel in a slot later than consecutive slots whose number is equal to the number of times of the repetition when the uplink shared channel or the downlink shared channel is transmitted or received in transmission occasions whose number is equal to the number of times of the repetition.

Advantageous Effects of Invention

According to one aspect of the present disclosure, the transmission/reception of the signal/channel to be transmitted by the multi-segment transmission can be appropriately controlled.

BRIEF DESCRIPTION OF DRAWINGS

FIGS. 7A and 7B are each a diagram to show an example of first and second repeated transmission according to a second aspect;

FIGS. 11A and 11B are each a diagram to show an example of first frequency hopping boundary determination according to a fourth aspect;

DESCRIPTION OF EMBODIMENTS (Multi-Segment Transmission)

In Rel. 15, the following has been under study: the user terminal (User Equipment (UE)) allocates a time domain resource (for example, a given number of symbols) in a single slot for at least one of a given channel and signal (channel/signal) (for example, an uplink shared channel (Physical Uplink Shared Channel (PUSCH)) or a downlink shared channel (Physical Downlink Shared Channel (PDSCH))) of a given transmission occasion (also referred to as a period, an occasion, or the like).

For example, in a given transmission occasion, the UE may transmit one or a plurality of transport blocks (TBs) by using the PUSCH allocated to a given number of consecutive symbols in a slot. In a given transmission occasion, the UE may transmit one or a plurality of TBs by using the PDSCH allocated to a given number of consecutive symbols in a slot.

On the other hand, in NR (for example, Rel. 16 or a later version), it is also assumed that a time domain resource (for example, a given number of symbols) is allocated across a slot boundary (over a plurality of slots) for a given channel/signal (for example, the PUSCH or the PDSCH) of a given transmission occasion.

Transmission of the channel/signal using the time domain resource allocated across the slot boundary (over a plurality of slots) in a given transmission occasion is also referred to as multi-segment transmission, two-segment transmission, cross slot boundary transmission, or the like. In a similar manner, reception of the channel/signal across the slot boundary is also referred to as multi-segment reception, two-segment reception, cross slot boundary reception, or the like.

Figure 1:
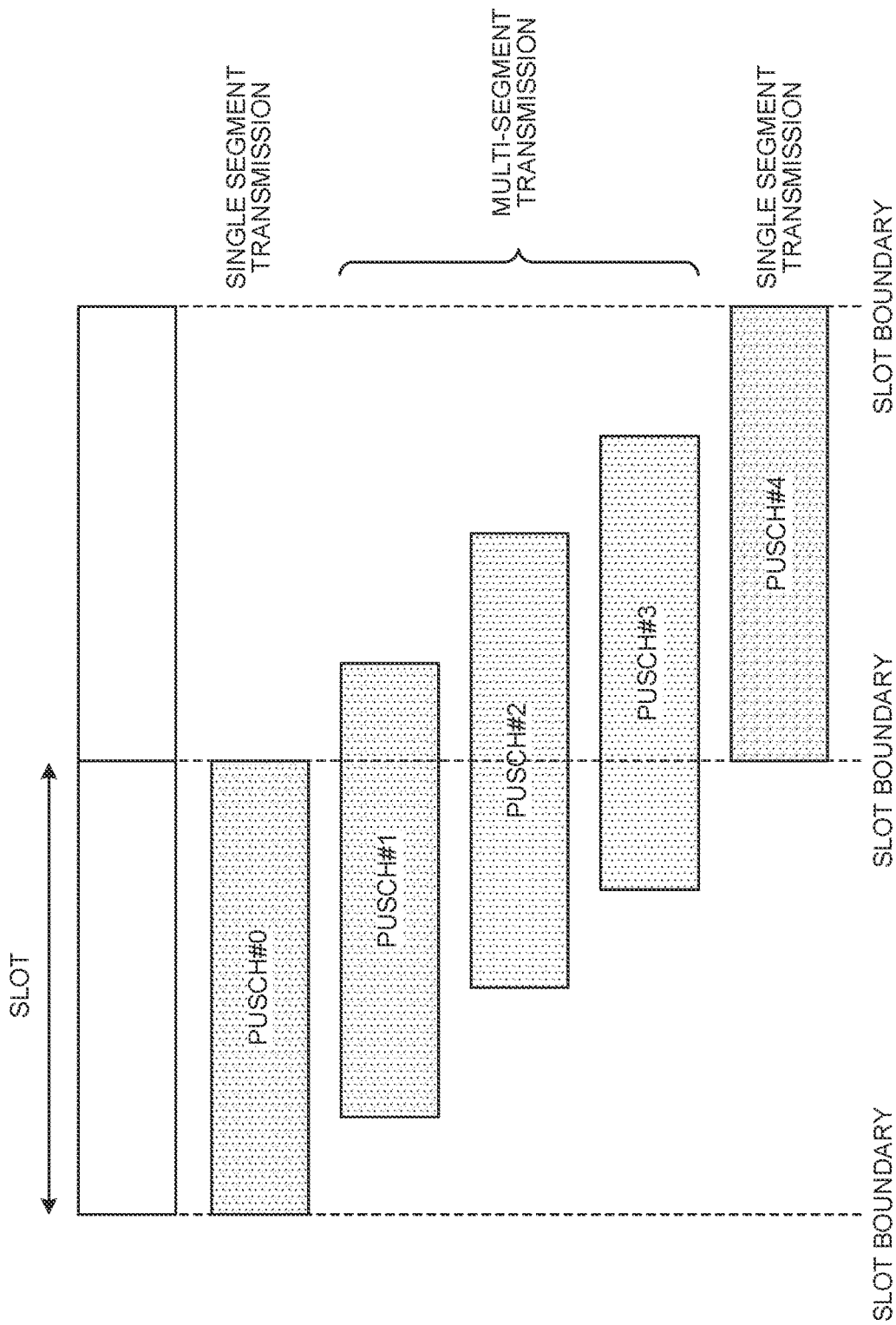
FIG. 1 is a diagram to show an example of multi-segment transmission.

FIG. 1 is a diagram to show an example of the multi-segment transmission. Note that FIG. 1 shows an example of the multi-segment transmission of the PUSCH. However, it goes without saying that the present invention can also be applied to other signals/channels (for example, the PDSCH and the like).

In FIG. 1, the UE may control transmission of the PUSCH allocated in one slot or across a plurality of slots, based on a given number of segments. Specifically, when the time domain resource over one or more slots is allocated to the PUSCH in a given transmission occasion, the UE may map each segment to a given number of allocation symbols in a corresponding slot.

Here, "segment" refers to a given data unit, and only needs to be at least a part of one or a plurality of TBs. For example, each segment may include one or a plurality of TBs, one or a plurality of code blocks (CBs), or one or a plurality of code block groups (CBGs). Note that one CB is a unit for coding of the TB, and may be obtained by segmenting the TB into one or a plurality of portions (CB segmentation). One CBG may include a given number of CBs.

The size (number of bits) of each segment may be, for example, determined based on at least one of the number of slots to which the PUSCH is allocated, the number of allocation symbols in each slot, and a ratio of the number of allocation symbols in each slot. The number of segments only needs to be determined based on the number of slots to which the PUSCH is allocated.

Alternatively, "segment" may be a given number of symbols in each slot allocated in one transmission occasion, or data transmitted by using the given number of symbols. For example, when the start symbol of the PUSCH allocated in one transmission occasion is present in the first slot and the end symbol is present in the second slot, with respect to the PUSCH, one or more symbols included in the first slot may be the first segment and one or more symbols included in the second slot may be the second segment.

For example, each of PUSCHs #0 and #4 is allocated to a given number of consecutive symbols in a single slot. In this case, the UE may map a single segment to the allocation symbols in the single slot. The single segment only needs to include, for example, one or a plurality of TBs. Transmission of the single segment in the single slot as described above may be referred to as single-segment transmission, one-segment transmission, or the like.

On the other hand, each of PUSCHs #1, #2, and #3 is allocated to a given number of consecutive symbols mapped over a plurality of slots (here, two slots) across the slot boundary. In this case, the UE may map a plurality of segments (for example, two segments) to the allocation symbols in a plurality of slots different from each other. Each segment only needs to include, for example, a data unit obtained by segmenting one or a plurality of TBs, such as one TB, a given number of CBs, or a given number of CBGs.

Transmission of the plurality of segments mapped over the plurality of slots as described above may be referred to as multi-segment transmission, two-segment transmission, cross slot boundary transmission, or the like. Note that one segment may correspond to each slot, or a plurality of segments may correspond to each slot.

(Time Domain Resource Allocation)

For NR, the following has been under study: the UE determines the time domain resource (for example, one or more symbols) allocated to the PUSCH or the PDSCH, based on a value of a given field (for example, a time domain resource allocation (Time Domain Resource Assignment or allocation (TDRA)) field) in downlink control information (DCI).

For example, the following has been under study: the UE determines a start symbol S and the number (time length or length) L of symbols of the PUSCH in a slot, based on the value of the TDRA field in the DCI (for example, DCI format 0_0 or 0_1).

Figures 2A, 2B:
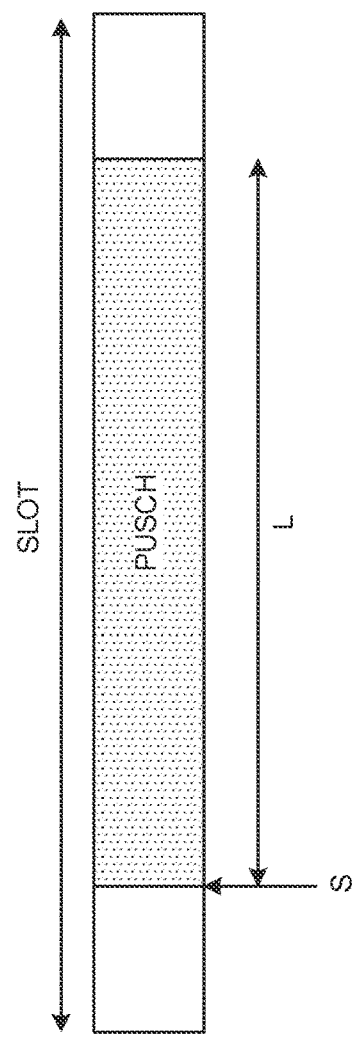
FIGS. 2A and 2B are each a diagram to show an example of allocation of a time domain resource to a PUSCH.

FIGS. 2A and 2B are each a diagram to show an example of allocation of the time domain resource to the PUSCH. As shown in FIG. 2A, the time domain resource allocated to the PUSCH may be determined based on the start symbol S relative to the start of a slot (starting symbol S relative to the start of the slot) and the number L of consecutive symbols. Note that the start symbol S may be alternatively referred to as an index S or a position S of the start symbol, for example.

For example, the UE may determine a row index (an entry number or an entry index) (for example, m+1) of a given table, based on a value m of the TDRA field in the DCI. The row index may indicate (may define, or may be associated with) a parameter (PUSCH time domain allocation parameter) related to allocation of the time domain resource to the PUSCH.

The PUSCH time domain allocation parameter may include, for example, at least one parameter of the following:

Information (offset information, K2 information) indicating a time offset K2 (also referred to as k2, $K_2$, or the like) between DCI and the PUSCH scheduled by using the DCI Information (mapping type information) indicating a mapping type of the PUSCH, and an identifier (Start and Length Indicator (SLIV)) indicating a combination of the start symbol S and the number L of symbols (or the start symbol S and the number L of symbols themselves)

The PUSCH time domain allocation parameter corresponding to each row index may be given by a given list (for example, "pusch-TimeDomainAllocationList" or "PUSCH-TimeDomainResourceAllocationList" of information elements (IEs) of radio resource control (RRC)) configured by a higher layer, or may be defined in a specification in advance.

For example, when the UE detects the DCI for scheduling the PUSCH in slot #n, the UE may determine a slot for transmitting the PUSCH, based on the K2 information indicated by the row index (for example, m+1) given by the TDRA field value m in the DCI.

The UE may determine the start symbol S and the number L of symbols allocated to the PUSCH in the determined slot, based on the SLIV indicated by the row index (for example, m+1) given by the TDRA field value m in the DCI.

Specifically, the UE may derive the start symbol S and the number L of symbols from the SLIV, based on a given rule. For example, the given rule may be the following Expression 1 if (L−1) is equal to or less than 7, and may be the following Expression 2 if (L−1) is greater than 7.

If $(L-1) \leq 7$, $$SLIV=14 \cdot (L-1)+S \quad \text{(Expression 1)}$$

If $(L-1)>7$, $$SLIV=14 \cdot (L-1)+(14-1-S) \quad \text{(Expression 2)}$$

Alternatively, the UE may determine the start symbol S and the number L of symbols allocated to the PUSCH in the determined slot, based on the start symbol S and the number V of symbols directly indicated by the row index (for example, m+1) given by the TDRA field value m in the DCI.

The UE may determine the mapping type of the PUSCH, based on the mapping type information indicated by the row index (for example, m+1) given by the TDRA field value m in the DCI.

FIG. 2B shows an example of the start symbol S and the number L of symbols recognized by the UE as an enabled allocation of the PUSCH. As shown in FIG. 2B, values of the start symbol S and the number L of symbols recognized as an enabled allocation of the PUSCH may be indicated for each of at least one of the mapping type of the PUSCH and a cyclic prefix (CP) length.

As shown in FIG. 2B, in NR of Rel. 15 or earlier versions, a maximum value of the start symbol S and the number L of symbols is 14. This is because the multi-segment transmission described above is not assumed; specifically, allocation of the PUSCH in one slot is assumed, and S=0 is fixed to the start symbol (symbol #0) of the slot.

Note that the description above illustrates a case in which the SLIV is indicated by the TDRA field value in the DCI (for example, a case in which the PUSCH is scheduled by using the DCI (a UL grant, a dynamic grant), or a case of a type 2 configuration grant). However, the present invention is not limited to these cases. The SLIV may be configured by using a higher layer parameter (for example, in a case of a type 1 configuration grant).

The description above illustrates the allocation of the time domain resource to the PUSCH. However, allocation of the time domain resource to the PDSCH may be performed in a similar manner as well. The allocation of the time domain resource to the PDSCH can be applied by replacing the PUSCH in the above description with the PDSCH.

In a case of the PDSCH, the K2 information only needs to be replaced with information (also referred to as offset information, K0 information, or the like) indicating an offset K0 (also referred to as k0, $K_0$, or the like) between DCI and the PDSCH scheduled by using the DCI. Note that, to derive the start symbol S and the number L of symbols of the PDSCH, an expression the same as Expression (1) or (2) shown above may be used, or a different expression may be used. In the case of the PDSCH, the DCI may be, for example, DCI format 1_0 or 1_1.

(Repeated Transmission)

For NR, transmission of the PUSCH or the PDSCH with repetition has been under study. Specifically, in NR, transmission of the TB based on the same data in one or more transmission occasions has been under study. Each of the transmission occasions falls within one slot, and the TB may be transmitted N times in N consecutive slots. In this case, the terms "transmission occasion", "slot", and "repetition" can be interchangeably used.

The repeated transmission may be referred to as slot-aggregation transmission, multi-slot transmission, or the like. The number N of times of repetition (number of aggregations, aggregation factor) may be specified for the UE by using at least one of the higher layer parameter (for example, "pusch-AggregationFactor" or "pdsch-AggregationFactor" of the RRC IEs) and the DCI.

The same symbol allocation may be applied among the N consecutive slots. The same symbol allocation among slots may be determined as described in the time domain resource allocation. For example, the UE may determine the symbol allocation in each slot, based on the start symbol S and the number L of symbols that is determined based on the value m of the given field (for example, the TDRA field) in the DCI. Note that the UE may determine the start slot, based on the K2 information that is determined based on the value m of the given field (for example, the TDRA field) in the DCI.

On the other hand, among the N consecutive slots, a redundancy version (RV) applied to the TB based on the same data may be the same, or at least a part of the RV may be different. For example, the RV applied to the TB in the n-th slot (transmission occasion, repetition) may be determined based on a value of a given field (for example, an RV field) in the DCI.

When the resource allocated to the N consecutive slots has a communication direction different from the UL, the DL, or the flexible) of each slot specified by using at least one of uplink and downlink communication direction indication information (for example, "TDD-UL-DL-ConfigCommon" or "TDD-UL-DL-ConfigDedicated" of the RRC IEs) for TDD control and a slot format indicator of the DCI (for example, DCI format 2_0) in at least one symbol, the resource of the slot including the symbol may not be transmitted (or may not be received).

(Frequency Hopping)

In NR, frequency hopping (FH) may be applied to the signal/channel. Will be described. For example, inter-slot frequency hopping or intra-slot frequency hopping may be applied to the PUSCH.

The intra-slot frequency hopping may be applied to both of the PUSCH that is transmitted with repetition and the PUSCH that is transmitted without repetition (a single time). The inter-slot frequency hopping may be applied to the PUSCH that is transmitted with repetition.

A frequency offset (also simply referred to as an offset) between frequency hops (also simply referred to as hops) (for example, between a first hop and a second hop) may be determined based on at least one of the higher layer parameter and a given field value in the DCI. For example, a plurality of offsets (for example, two or four offsets) may be configured for a grant (dynamic grant) on the DCI or a configuration grant (type 2 configuration grant) whose activation is controlled by the DCI, by using the higher layer parameter, and one of the plurality of offsets may be specified by using the given field value in the DCI.

Figure 3A:
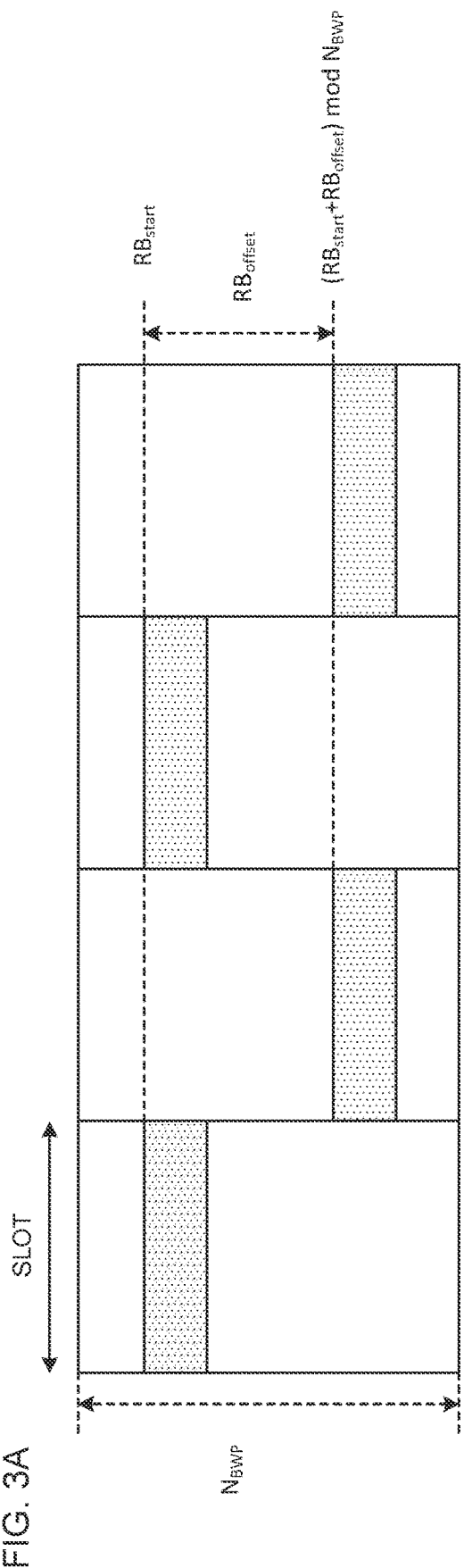
FIGS. 3A and 3B are each a diagram to show an example of frequency hopping.
Figure 3B:
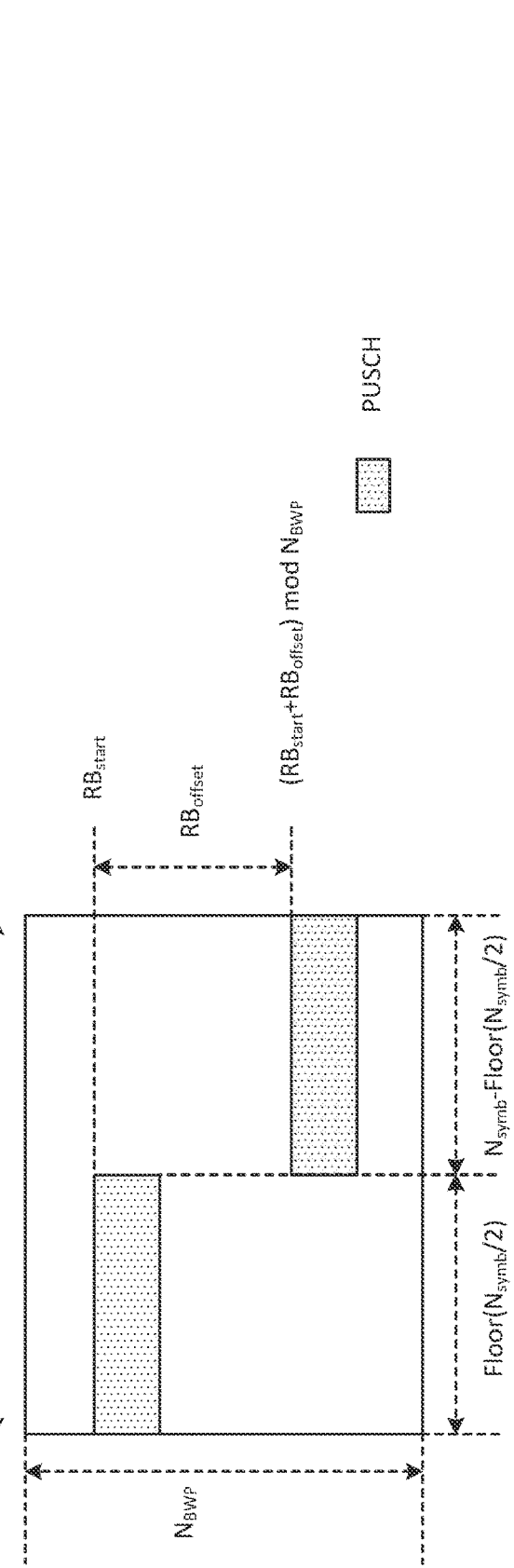

FIGS. 3A and 3B are each a diagram to show an example of the frequency hopping. As shown in FIG. 3A, the inter-slot frequency hopping is applied to the repeated transmission, and the frequency hopping may be controlled for each slot. A start RB of each hop may be determined based on at least one of an index $RB_{start}$ of the start RB of a frequency domain resource allocated to the PUSCH, an offset $RB_{offset}$ given by at least one of the higher layer parameter and the given field value in the DCI, and the size (number of RBs) $N_{BWP}$ in a given band (for example, a BWP).

For example, as shown in FIG. 3A, the index of the start RB of the slot whose slot number is an even number may be $RB_{start}$, and the index of the start RB of the slot whose slot number is an odd number may be calculated by using $RB_{start}$, $RB_{offset}$, and $N_{BWP}$ (for example, according to the following Expression (3)).

$$(RB_{start}+RB_{offset}) \bmod N_{BWP} \qquad \text{Expression (3)}$$

The UE may determine the frequency domain resource (for example, a resource block or a physical resource block (PRB)) allocated to each slot (repetition, transmission occasion) that is determined based on a value of a given field (for example, a frequency domain resource allocation (FDRA) field) in the DCI. The UE may determine $RB_{start}$ based on the value of the FDRA field.

Note that, when the inter-slot frequency hopping is applied as shown in FIG. 3A, the frequency hopping need not be applied in the slot.

As shown in FIG. 3B, the intra-slot frequency hopping may be applied to the transmission without repetition. Alternatively, although not shown, the intra-slot frequency hopping may be applied in each slot (transmission occasion) of the repeated transmission. The start RB of each hop in FIG. 3B may be determined in a manner similar to that of the inter-slot frequency hopping described with reference to FIG. 3A.

In the intra-slot frequency hopping of FIG. 3B, the number of symbols of each hop (a boundary of each hop or a frequency hopping boundary) may be determined based on the number $N_{symb}$ of symbols allocated to the PUSCH of a given transmission occasion.

The time domain resource allocation, the repeated transmission, and the frequency hopping described above are designed on the premise that the time domain resource allocated to the signal/channel in a given transmission occasion falls within a single slot (does not cross the slot boundary).

On the other hand, as described above, in NR (for example, Rel. 16 or a later version), introduction of the multi-segment transmission whereby the time domain resource is allocated over a plurality of slots (across the slot boundary) in a given transmission occasion has been under study. Thus, how to control the multi-segment transmission poses a problem.

In the light of this, the inventors of the present invention examined determination of the time domain resource that can also be applied to the multi-segment transmission (first aspect), the repeated transmission (second aspect), the frequency hopping at the time of the repeated transmission (third aspect), and the frequency hopping in a single transmission occasion (fourth aspect), and thereby came up with the idea of appropriately controlling transmission or reception of a signal/channel using the time domain resource that is allocated over one or more slots in a given transmission occasion.

Embodiments according to the present disclosure will be described in detail with reference to the drawings as follows. Note that the first to fourth aspects described below may be used individually, or may be used in combination of at least two of the aspects.

(First Aspect)

In the first aspect, determination of the time domain resource that can also be applied to the multi-segment transmission will be described. As described above, in Rel. 15, it is premised that the time domain resource allocated to the PUSCH or the PDSCH in a given transmission occasion falls within a single slot (does not cross the slot boundary), and the start symbol S and the number L of symbols are determined with the start of the slot being used as a reference. Thus, the UE may be unable to appropriately determine the allocated time domain resource of the PUSCH or the PDSCH over one or more slots (across the slot boundary) in the given transmission occasion.

In the light of above, in the first aspect, timing being used as a reference of the start symbol of the PUSCH or the PDSCH in the given transmission occasion is reported (first time domain resource determination). Alternatively, an index is assigned to each unit including a plurality of symbols in a plurality of consecutive slots (first time domain resource determination). With this configuration, the time domain resource allocated over one or more slots (across the slot boundary) in the given transmission occasion can be appropriately determined.

In the first aspect described below, the PUSCH will be mainly described. However, the present invention can be applied to other channels (for example, the PUSCH) as well as appropriate. In the description below, the dynamic grant-based PUSCH will be described. However, the present invention can be applied to the PUSCH based on the configuration grant of type 2 or the configuration grant of type 1 as well as appropriate.

<First Time Domain Resource Determination>

In a first time domain resource determination, the UE may receive information related to timing being used as a reference of the start symbol of the PUSCH (also referred to as reference timing, reference start timing, symbol timing, start symbol timing, or the like).

The information related to the reference timing may be, for example, information indicating a value (reference timing value) S' indicating the reference timing. The reference timing value S' may be, for example, an offset value with respect to the start of the slot, the number of symbols from the start of the slot, or the like.

The reference timing value S' may be specified by using at least one of the higher layer parameter and a value of a given field in the DCI (for example, the DCI for scheduling the PUSCH). The given field may be another given field (also referred to as a reference timing field or the like) that is different from the TDRA field used for determination of the SLIV. The value of the given field may indicate one of one or more candidate values of the reference timing value S'. The candidate value may be defined in a specification in advance, or may be configured by using the higher layer parameter (for example, the RRC IE).

The UE may determine the reference timing value S', based on at least one of the higher layer parameter and the given field value in the DCI. The UE may determine the time domain resource allocated to the PUSCH, based on the reference timing value S' and the SLIV (or the start symbol S and the number L of symbols).

For example, the UE may determine the time domain resource allocated to the PUSCH, based on the SLIV (or the start symbol S and the number L of symbols), by using the symbol in which the reference timing value S' is given to the start of the slot as a reference instead of using the start of the slot as a reference.

As described above, the UE may determine the SLIV, based on the value m of the TDRA field in the DCI for scheduling the PUSCH. Specifically, the UE may determine the SLIV (or the start symbol S and the symbol L) that is indicated by the row index determined by the value m of the TDRA field in a given table. The UE may derive the start symbol S and the number of symbols, based on the SLIV.

Note that the UE may determine the reference timing value S', based on the value m of the TDRA field. Specifically, the UE may determine the reference timing value S' that is indicated by the row index determined by the value m of the TDRA field in a given table. In this case, the PUSCH time domain allocation parameter may include the reference timing value S'. With this configuration, the reference timing value S' can be specified without adding a new field in the DCI.

The UE may determine the symbols of the number L of consecutive symbols from the start symbol S relative to the symbol that is indicated by the reference timing value S' determined as described above as the time domain resource allocated to the PUSCH.

Figure 4:
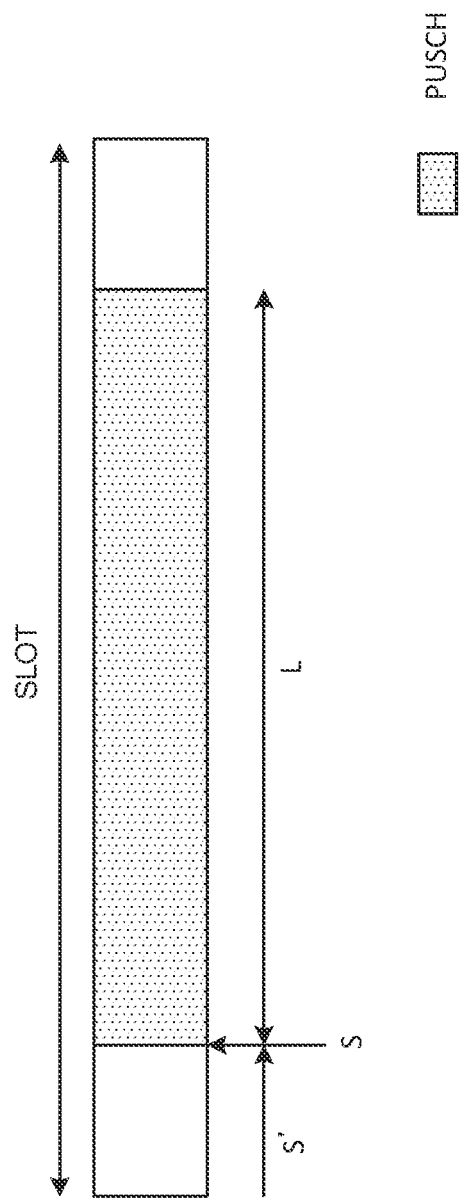
FIG. 4 is a diagram to show an example of determination of the time domain resource according to a first aspect.

FIG. 4 is a diagram to show an example of determination of the time domain resource according to the first aspect. For example, in FIG. 4, for the UE, start symbol S=0 is determined, based on the SLIV that is determined based on the TDRA field value m in the DCI. The reference timing value S' is determined based on a given field value in the DCI.

In a given slot (for example, a slot determined based on the K2 information), the UE may determine the number L of consecutive symbols (in other words, symbol #S'+S to symbol #S'+S+L) from symbol #S'+S, which is later than symbol #S' by the start symbol S, as the time domain resource allocated to the PUSCH.

In this manner, the start symbol S may be an offset value (also referred to as a value indicating a relative start symbol, a value indicating relative start timing, a value indicating a relative start position, or the like) with respect to the reference timing (for example, the symbol assigned with the index S' (symbol #S')) determined by the reference timing value S'.

Figure 5:
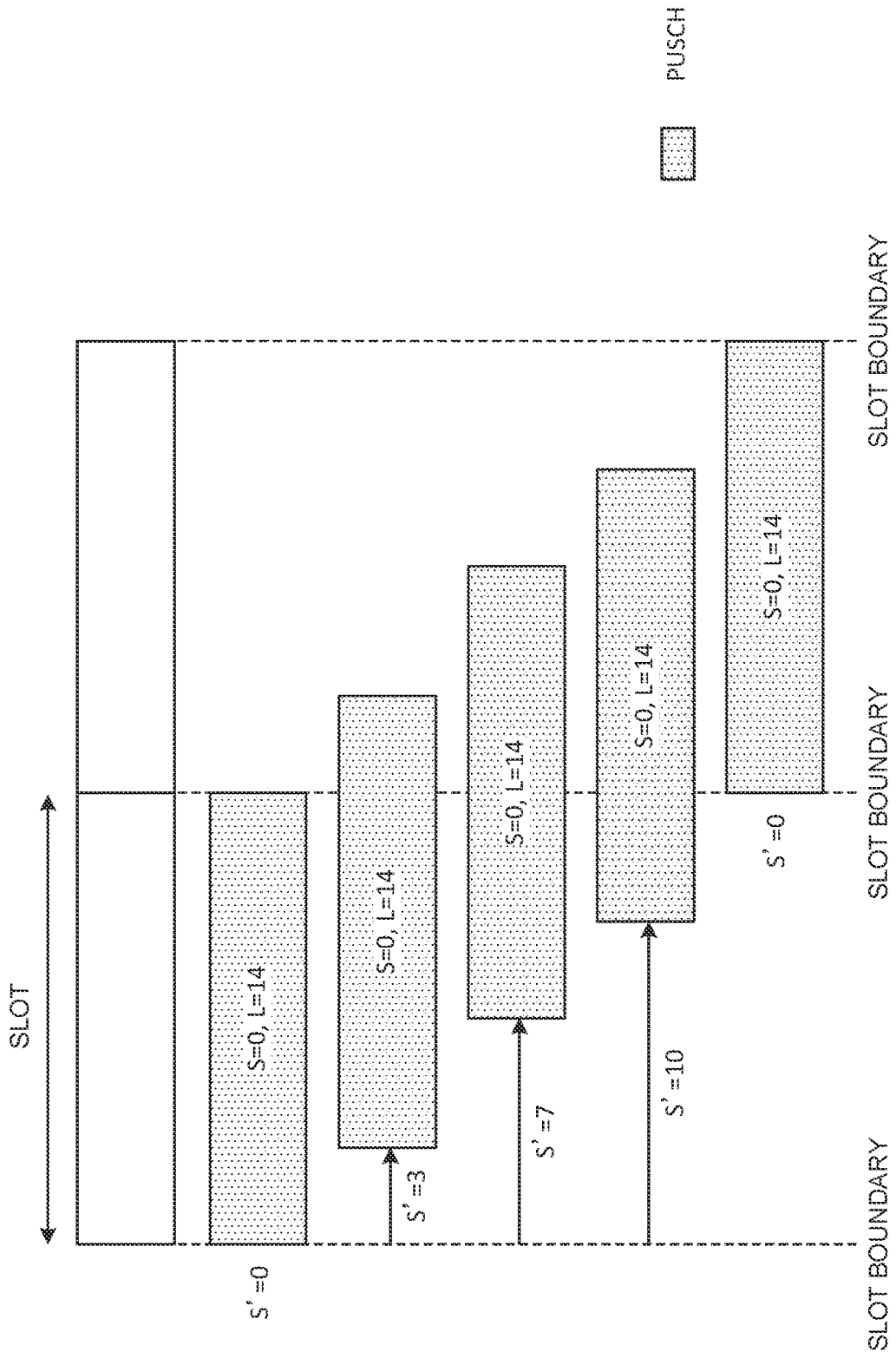
FIG. 5 is a diagram to show an example of first time domain resource determination according to the first aspect.

FIG. 5 is a diagram to show an example of the first time domain resource determination according to the first aspect.

For example, FIG. 5 shows an example in which candidate values of the reference timing value S' are 0, 3, 7, and 10. Note that the candidate values are merely an example, and the number, the value, and the like of the candidate values are not limited to those shown in the figure.

FIG. 5 shows an example in which the start symbol S determined based on the TDRA field value m in the DCI is 0, and the number L of symbols is 14. However, the start symbol S and the number L of symbols are not limited to those. The UE determines the K2 information, based on the TDRA field value m, and determines L consecutive symbols from symbol #S'+S of the slot determined based on the K2 information as the time domain resource allocated to the PUSCH.

As shown in FIG. 5, when the reference timing value S' is greater than 0 (3, 7, and 10 in FIG. 4), the PUSCH is allocated to the consecutive symbols in a plurality of slots across the slot boundary. The UE may segment the PUSCH (one or a plurality of TBs) so as to correspond to the plurality of respective slots and transmit the segmented PUSCH.

In this manner, by reporting the reference offset value S' to the UE, the time domain resource allocated to the PUSCH can be determined on the symbol basis, based on the TDRA field value m in the DCI. In this case, the time domain resource can be allocated on the symbol basis in both of the single segment transmission (for example, S'=0 in FIG. 5) and the multi-segment transmission (for example, S'=3, 7, or 10 in FIG. 5).

Note that the size (number of bits) of the given field indicating the reference timing value S' in the DCI may be defined in a specification in advance, or may be determined based on the number $X_{S'}$ of candidate values of the reference timing value S' configured by using the higher layer parameter (for example, the RRC IE). For example, the size of the given field may be determined according to ceil$\{\log 2(X_{S'})\}$.

The DCI including the given field indicating the reference timing value S' is DCI used for scheduling of the PUSCH, and may be, for example, DCI format 0_0 or 0_1 or a DCI format different from these. Such a different DCI format may be, for example, a DCI format for scheduling the PUSCH of a type of specific traffic (for example, Ultra Reliable and Low Latency Communications (URLLC)).

The UE may determine whether or not the given field indicating the reference timing value S' is included in the DCI, based on at least one of the following (1) to (4).
(1) Radio network temporary identifier (RNTI) used for scramble (CRC scramble) of redundancy check (Cyclic Redundancy Check) bits of the DCI
(2) Size of the DCI format
(3) Configuration of a search space in which the DCI is monitored]
(4) Frequency band (for example, a component carrier (CC) (also referred to as a cell, a serving cell, a carrier, or the like) or a bandwidth part (BWP)) in which the DCI is detected When the PUSCH is scheduled by using DCI format 0_0, the UE may assume or expect that the given field indicating the reference timing value S' is not included in the DCI format 0_0, or may assume or expect that the value of S' is 0. The UE may assume that the PUSCH is allocated in one slot (without crossing the slot boundary) in the given transmission occasion.

In the first time domain resource determination, by reporting the reference offset value S' to the UE, the time domain resource of the PUSCH for the multi-segment transmission can be appropriately determined by reusing the method of determining the time domain resource according to the existing SLIV (or the start symbol S and the number L of symbols).

<Second Time Domain Resource Determination>

In a second time domain resource determination, the time domain resource for the PUSCH may be allocated based on a time unit different from the symbols (for example, a time unit including a plurality of consecutive symbols).

In the second time domain resource determination, the allocation of the time domain resource across the slot boundary (in other words, the multi-segment transmission) may be implemented by allocating the time domain resource for the PUSCH on a time unit basis, the time unit including a plurality of consecutive symbols.

Specifically, an index (also referred to as a unit index, a time unit index, or the like) may be assigned to each time unit included in a plurality of consecutive slots. For example, 14 time units may be included in the plurality of slots, and unit indexes #0 to #13 may be assigned to the 14 time units in ascending order in the time direction.

The number of symbols constituting each time unit may be determined based on how many symbol boundaries are crossed in allocation of the PUSCH (in other words, the number of slots to which a single PUSCH (one repetition) is allocated). For example, when the PUSCH is allocated across one symbol boundary over two slots, each time unit may include two consecutive symbols. The number of symbols constituting each time unit need not be the same, and for example, time units of 3 and 4 symbols may coexist in the plurality of consecutive slots.

The number of symbols constituting each time unit (also referred to as a unit pattern, a unit configuration, or the like) may be defined in a specification in advance, or may be configured by using the higher layer parameter.

For the UE, the SLIV determined based on the TDRA field value m in the DCI may be used as an identifier that indicates a combination of the first time unit (start unit) S allocated to the PUSCH and the number L of consecutive time units from the time unit S, instead of indicating a combination of the start symbol S and the number L of symbols.

Specifically, the UE may determine the SLIV (or S and L) that is indicated by the row index determined by the TDRA field value m in the DCI in a given table. The UE may derive the start unit S and the number L of units, based on the SLIV. Alternatively, the UE may determine the start unit S and the number L of units that are indicated by the row index determined by the TDRA field value m in the DCI in a given table.

Figure 6A:
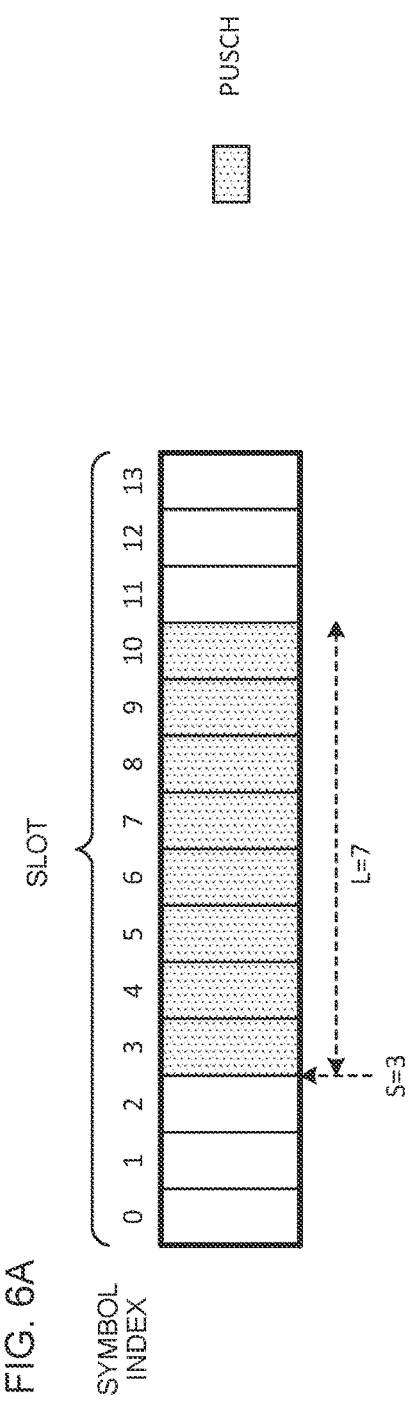
FIGS. 6A and 6B are each a diagram to show an example of second time domain resource determination according to the first aspect.
Figure 6B:
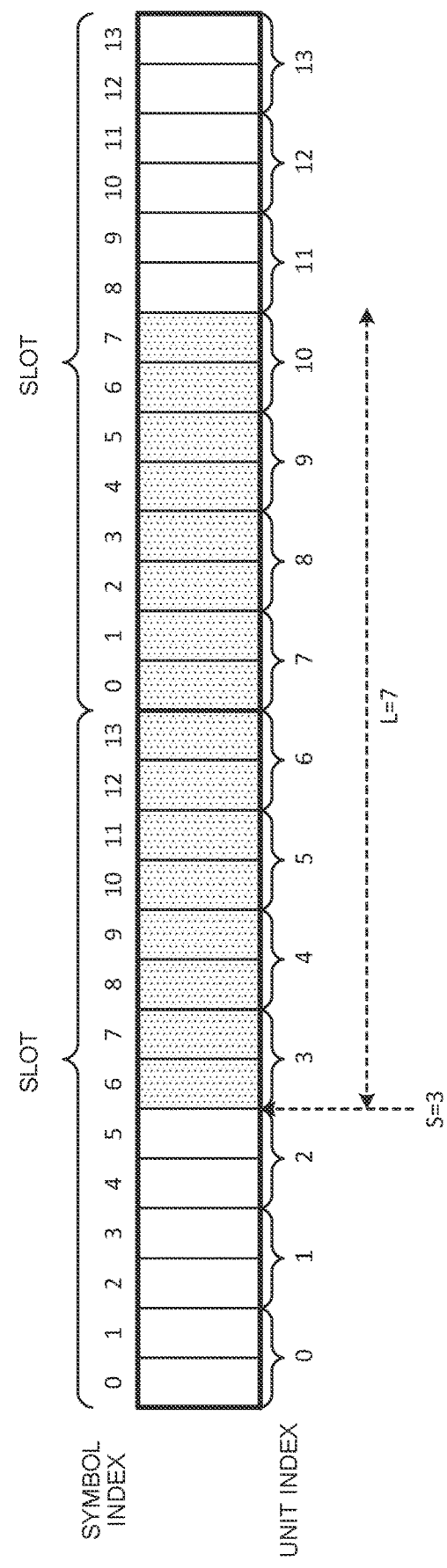

FIGS. 6A and 6B are each a diagram to show an example of the second time domain resource determination according to the first aspect. For example, in FIGS. 6A and 6B, S=3 and L=7 are derived from the SLIV that is determined based on the TDRA field value m in the DCI. However, the values of S and L are not limited to those in the figures.

As shown in FIG. 6A, in a case of the symbol basis, L consecutive symbols (L=7) from start symbol #S (here, S=3) are allocated to the PUSCH. On the other hand, as shown in FIG. 6B, in the case of the time unit basis, L consecutive units (L=7) are allocated to the PUSCH from start unit #S (here, S=3).

As shown in FIG. 6B, in the case of the time unit basis, the value(s) of the SLIV or S and L is interpreted, instead of the value indicating the symbol allocated to the PUSCH, as the value indicating the time unit allocated to the PUSCH.

In the case of the time unit basis, the minimum value of the time domain resource allocated to the PUSCH is equal to the length of one time unit (for example, 2 symbols in FIG. 6B). The maximum value of the time domain resource is a value obtained by multiplying the length of one time unit by the number of time units (=14) (for example, 28 symbols in FIG. 6B).

As shown in FIG. 6B, by alternatively interpreting the SLIV (or S and L) as the value indicating the time unit allocated to the PUSCH, the time domain resource over a plurality of slots can be allocated to the PUSCH by reusing ab existing method.

Note that the UE may determine on which the symbol basis or the unit basis the value(s) of the SLIV or S and L indicates the time domain resource for the PUSCH, based on at least one of the following (1) to (4).

(1) RNTI used for CRC scramble of the DCI
(2) Size of the DCI format
(3) Configuration of a search space in which the DCI is monitored
(4) Frequency band (for example, a CC or a BWP) in which the DCI is detected Alternatively, on which the symbol basis or the unit basis the value(s) of the SLIV or S and L indicates the time domain resource for the PUSCH may be configured for the UE by using the higher layer parameter (for example, the RRC IE).

When the PUSCH is scheduled by using DCI format 0_0, the UE may assume or expect that the SLIV (or S and L) that is determined based on the TDRA field value in the DCI format 0_0 is on the symbol basis.

In the second time domain resource determination, the time domain resource of the PUSCH for the multi-segment transmission can be appropriately determined by reusing the method of determining the time domain resource according to the existing SLIV (or the start symbol S and the number L of symbols), even without reporting the reference timing value S' as in the case of the first time domain resource determination.

As described above, in the first aspect, the time domain resource allocated in the multi-segment transmission can be determined while the method that premises the allocation of the time domain resource in a single slot in the given transmission occasion is reused. Therefore, the multi-segment transmission can be introduced while increase of an implementation load is suppressed.

(Second Aspect)

In the second aspect, repetition of the multi-segment transmission will be described. When the UE receives information indicating the number X of times of repetition (also referred to as an aggregation factor, the number of aggregations, a repetition factor, or the like), the UE may assume that the multi-segment transmission is repeated X times (X times of transmission occasions).

The UE may assume that the time domain resource is allocated by using the same pattern in each repetition (transmission occasion). The pattern may include at least one of the start position and the time length in the given transmission occasion.

For example, the pattern may include the start symbol relative to the reference timing (for example, symbol #S') indicated by the reference timing value S' and the number of symbols (the first time domain resource determination), or may include the start unit relative to the start of the slot and the number of units (the second time domain resource determination). In this manner, the second aspect can be applied in combination with the first aspect.

For the UE, in the multi-segment transmission with the number X of times of repetition, X' consecutive slots (for example, X'=X+1), X' being a number greater than X, may be used (first repeated transmission), or X consecutive slots may be used (second repeated transmission).

In the second aspect described below, the PUSCH will be mainly described. However, the present invention can be applied to other channels (for example, the PUSCH) as well as appropriate. In the description below, the dynamic grant-based PUSCH will be described. However, the present invention can be applied to the PUSCH based on the configuration grant of type 2 or the configuration grant of type 1 as well as appropriate.

<First Repeated Transmission>

In the first repeated transmission, the UE may assume that X times of the multi-segment transmission are repeated over the X' consecutive slots, X' being a number greater than the number X of times of repetition of the multi-segment transmission.

FIG. 7A is a diagram to show an example of the first repeated transmission according to the second aspect. FIG. 7A shows an example in which the PUSCH with the number X of times of repetition (here, X=4) is scheduled by using a single piece of the DCI. The number X of times of repetition only needs to be specified for the UE by using at least one of the higher layer parameter and the DCI. In FIG. 7A, the time domain resource allocated to the PUSCH is shown in the j (for example, 1≤j≤X)-th repetition (transmission occasion).

As shown in FIG. 7A, when the multi-segment transmission is not applied, slots (for example, four slots in FIG. 7A) whose number is equal to the number X of times of repetition may be used for transmission of the PUSCH. On the other hand, when the multi-segment transmission is applied, X' slots (for example, five slots in FIG. 7A) may be used for transmission of the PUSCH, X' being a number greater than the number X of times of repetition.

Among the X times of repetition (transmission occasion) of the multi-segment transmission, different RVs may be applied to the TBs that are based on the same data. The RV applied to each of the X times of repetition may be specified by using a value of a given field (for example, the RV field) in the DCI, or may be configured by using RRC signaling (higher layer parameter) or the like.

As shown in FIG. 7A, the time domain resource allocated in the same pattern may be used in all of the X times of repetition (transmission occasion), regardless of whether or not the transmission is the multi-segment transmission. In this case, gains of the repetition can be appropriately obtained also when the multi-segment transmission is performed.

<Second Repeated Transmission>

In the second repeated transmission, the UE may assume that transmission of at least a part of the multi-segment transmission is cancelled in the transmission occasion including a symbol that exceeds the consecutive slots whose number is equal to the number X of times of repetition of the multi-segment transmission.

FIG. 7B is a diagram to show an example of the second repeated transmission according to the second aspect. In FIG. 7B, difference from FIG. 7A will be mainly described. As shown in FIG. 7B, when the multi-segment transmission is applied, a part of the time domain resource for the multi-segment transmission in a given transmission occasion (for example, the j (=X)-th transmission occasion) is allocated beyond the X consecutive slots. In this case, the UE may cancel the transmission (transmission of a part of the segment) in the part of the time domain resource.

In FIG. 7B, only the consecutive slots (four slots in FIG. 7B) whose number is equal to the number X of times of repetition are used for repetition of the multi-segment transmission. This can prevent complication of control of scheduling due to unmatch between the number X of times of repetition and the number of consecutive slots in repetition of the multi-segment transmission.

As described above, according to the second aspect, the UE can perform appropriate control also when the multi-segment transmission is performed with repetition. By setting the number of slots in which the multi-segment transmission is performed to the number of times that is the same as the configured number of times of repetition, the base station can appropriately perform resource control.

(Third Aspect)

In a third aspect, frequency hopping when repetition of the multi-segment transmission is performed will be described. In a case of repetition of the single segment transmission, as described above, the inter-slot frequency hopping (for example, FIG. 3A) can be applied. On the other hand, in a case of repetition of the multi-segment transmission, a problem is how to control the frequency hopping.

In the third aspect, the frequency hopping in the case of repetition of the multi-segment transmission may be controlled for each slot (first frequency hopping procedure), or may be controlled for each repetition (transmission occasion) (second frequency hopping procedure).

In the third aspect described below, the PUSCH will be mainly described. However, the present invention can be applied to other channels (for example, the PUSCH) as well as appropriate. In the description below, the dynamic grant-based PUSCH will be described. However, the present invention can be applied to the PUSCH based on the configuration grant of type 2 or the configuration grant of type 1 as well as appropriate.

<First Frequency Hopping Procedure>

In the first frequency hopping procedure, when the multi-segment transmission is repeated, frequency hopping in one transmission occasion (one repetition, one multi-segment transmission) may be applied with the slot boundary being used as the frequency hopping boundary.

Figure 8:
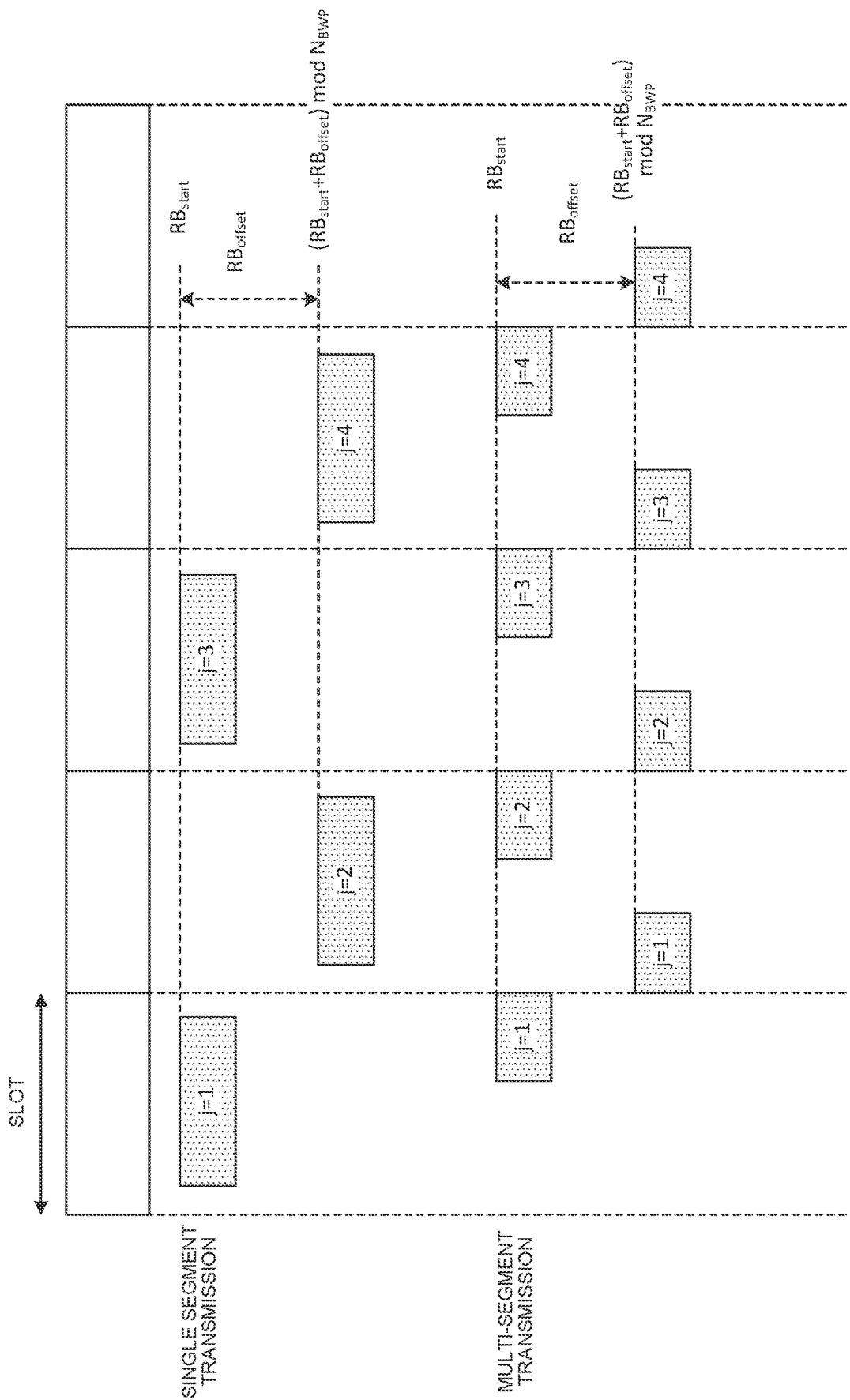
FIG. 8 is a diagram to show an example of a first frequency hopping procedure according to a third aspect.

FIG. 8 is a diagram to show an example of the first frequency hopping procedure according to the third aspect. In FIG. 8, difference from FIG. 3A will be mainly described. In FIG. 8, the offset $RB_{offset}$ between hops may be specified by using at least one of the higher layer parameter and the DCI.

The UE may determine the index of the start RB allocated to the multi-segment transmission transmitted with repetition of X times, based on a given field value in the DCI (for example, an FDRA field value) or the higher layer parameter (for example, "frequencyDomainAllocation" in the RRC IE "rrc-ConfiguredUplinkGrant").

As shown in FIG. 8, in repetition of the multi-segment transmission, the frequency resource may be hopped in one transmission occasion (one repetition) with the slot boundary being used as the frequency hopping boundary.

For example, in FIG. 8, the index of the start RB of the segment (first segment) before the slot boundary in the j-th transmission occasion may be $RB_{start}$, and the index of the start RB of the segment (second segment) after the slot boundary in the transmission occasion may be calculated by using at least one of $RB_{start}$, $RB_{offset}$, and $N_{BWP}$ (for example, according to Expression (3) shown above).

Note that, although not shown, it goes without saying that the start RB of the first segment may be determined by using at least one of $RB_{start}$, $RB_{offset}$, and $N_{BWP}$, and the start RB of the second segment may be $RB_{start}$.

Figure 9:
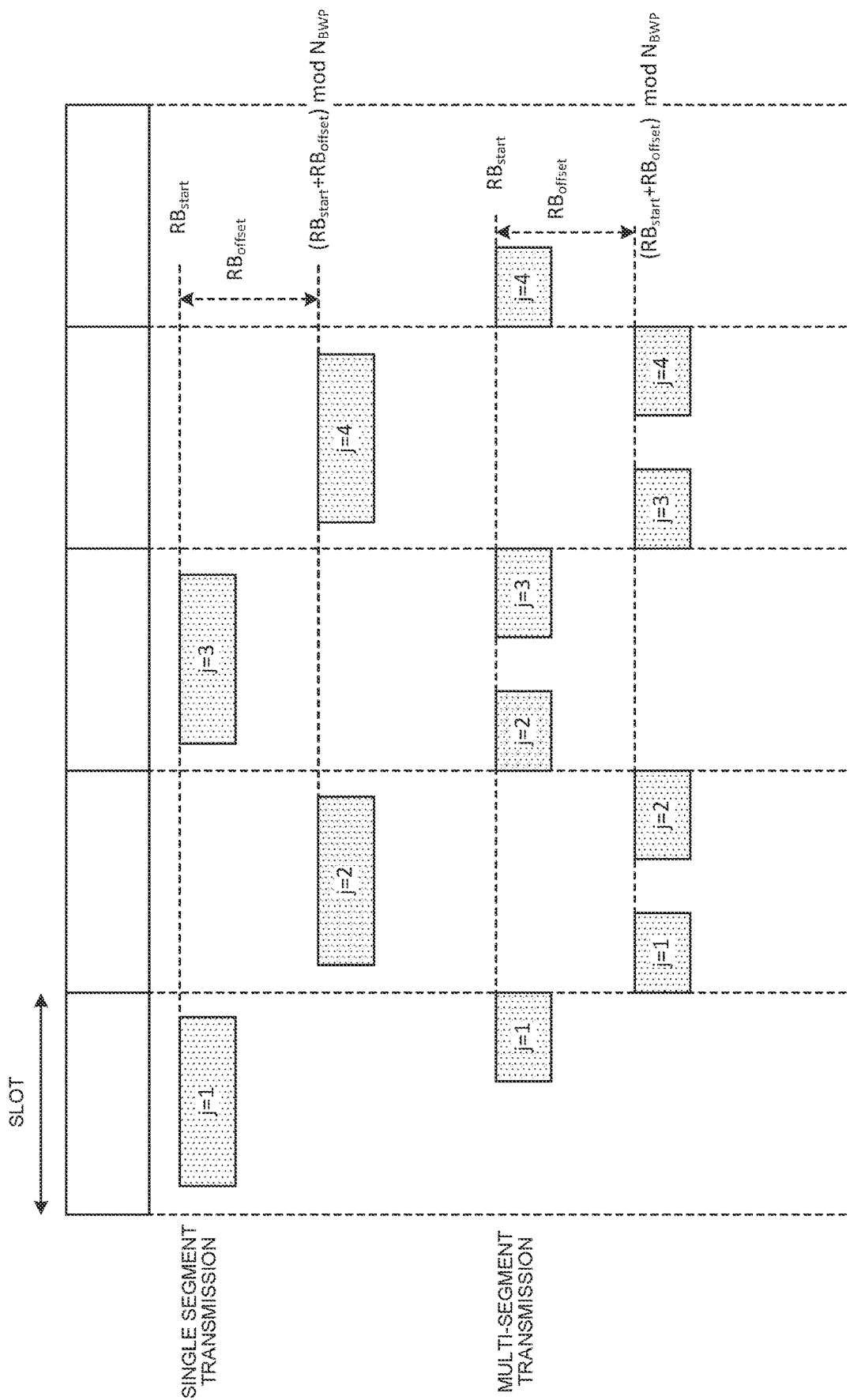
FIG. 9 is a diagram to show another example of the first frequency hopping procedure according to the third aspect.

In FIG. 8, patterns of the frequency hopping between the transmission occasions are the same, but the present invention is not limited to this. For example, as shown in FIG. 9, the patterns of the frequency hopping may be different between the transmission occasions. Specifically, as shown in FIG. 9, the index of the start RB of the first segment and the index of the start RB of the second segment may be interchanged with each other between adjacent transmission occasions (the j-th transmission occasion and the (j+1)-th transmission occasion).

For example, in FIG. 9, the index of the start RB of the first segment in the j-th (for example, j is an odd number) transmission occasion may be $RB_{start}$, and the index of the start RB of the second segment in the transmission occasion may be a value calculated based on at least one of $RB_{start}$, $RB_{offset}$, and $N_{BWP}$ (for example, Expression (3)). In this case, for example, as shown in FIG. 9, a pattern in which the frequency hopping is not performed in a slot (in other words, the same frequency resource is used) can be employed.

On the other hand, the index of the start RB of the first segment in the (j+1)-th (for example, (j+1) is an even number) transmission occasion may be a value calculated based on at least one of $RB_{start}$, $RB_{offset}$, and $N_{BWP}$ (for example, Expression (3)), and the index of the start RB of the second segment that belongs to slot #n+2 in the transmission occasion may be $RB_{start}$. Note that FIGS. 8 and 9 are merely an example, and the start RB of each hop is not limited to those shown in the figures.

As described above, the start RBs of the first segment and the second segment may be determined based on in what number in transmission occasions.

Alternatively, the start RBs of the first segment and the second segment may be determined based on from which slot number of a slot the transmission occasion starts. For example, when the index of the start RB of the first segment in the transmission occasion starting from a slot of an even-numbered slot number is $RB_{start}$, the index of the start RB of the first segment in the transmission occasion starting from an odd-numbered slot number may be a value calculated based on at least one of $RB_{start}$, $RB_{offset}$, and $N_{BWP}$ (for example, Expression (3)).

In FIG. 9, the same frequency resource is used for transmission of the segments (for example, the second segment in the j-th transmission occasion and the first segment in the (j+1)-th transmission occasion) that belong to different transmission occasions in the same slot. Therefore, with the use of channel estimation results for the second segment in a preceding transmission occasion, channel estimation for the first segment in its subsequent transmission occasion can be performed.

In the first frequency hopping procedure, when the inter-slot frequency hopping is configured by using the higher layer parameter, the frequency hopping in each transmission occasion using the slot boundary as the frequency hopping boundary (also referred to as intra-multi-segment transmission frequency hopping, intra-transmission occasion frequency hopping, or the like) may be applied to the multi-segment transmission.

Alternatively, when the intra-slot frequency hopping is configured by using the higher layer parameter, the intra-multi-segment transmission frequency hopping may be applied to the multi-segment transmission. Alternatively, when the intra-multi-segment transmission frequency hopping is configured by using the higher layer parameter apart from the inter-slot frequency hopping or the intra-inter-slot frequency hopping, the intra-multi-segment transmission frequency hopping may be applied to the multi-segment transmission.

In the first frequency hopping procedure, the frequency hopping can be controlled by using the slot boundary as a reference in the multi-segment transmission as well.

<Second Frequency Hopping Procedure>

In the second frequency hopping procedure, when the multi-segment transmission is repeated, hopping of the frequency resource may be controlled in each transmission occasion.

Figure 10:
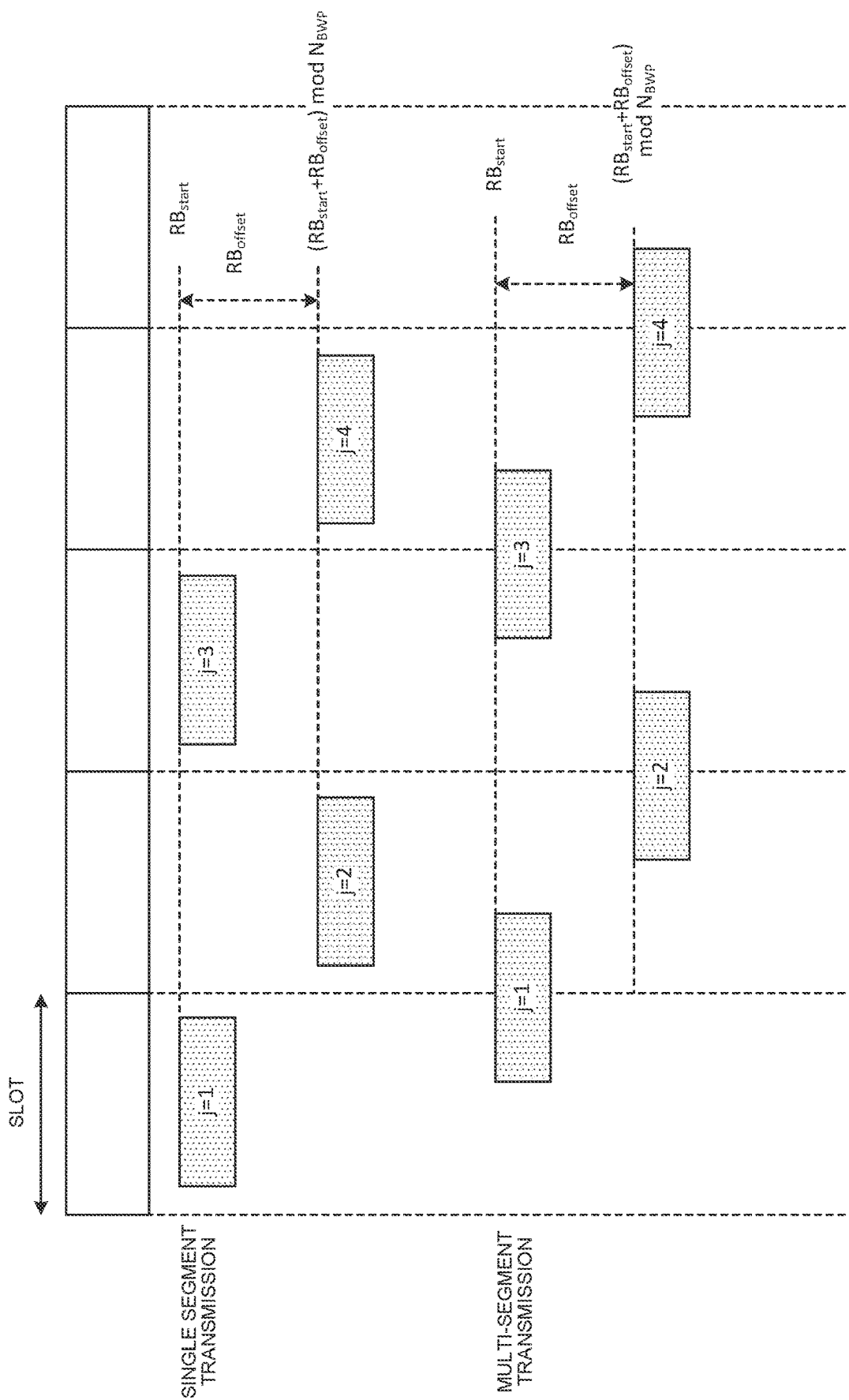
FIG. 10 is a diagram to show an example of a second frequency hopping procedure according to the third aspect.

FIG. 10 is a diagram to show an example of the second frequency hopping procedure according to the third aspect. In FIG. 10, difference from FIG. 8 will be mainly described. As shown in FIG. 10, in repetition of the multi-segment transmission, the frequency resource may be hopped between transmission occasions (repetitions) in a manner similar to the single segment transmission.

For example, in FIG. 10, the index of the start RB in the j-th (for example, j is an odd number) transmission occasion may be $RB_{start}$, and the index of the start RB of the first segment in the (j+1)-th (for example, (j+1) is an even number) transmission occasion may be a value calculated based on at least one of $RB_{start}$, $RB_{offset}$, and $N_{BWP}$ (for example, Expression (3)). Note that FIG. 10 is merely an example, and the start RB of each hop is not limited to those shown in the figure.

As described above, the start RB of each transmission occasion may be determined based on in what number in transmission occasions.

Alternatively, the start RB of each transmission occasion may be determined based on from which slot number of a slot the transmission occasion starts. For example, when the index of the start RB in the transmission occasion starting from a slot of an even-numbered slot number is $RB_{start}$, the index of the start RB in the transmission occasion starting from an odd-numbered slot number may be a value calculated based on at least one of $RB_{start}$, $RB_{offset}$, and $N_{BWP}$ (for example, Expression (3)).

In the second frequency hopping procedure, when the inter-slot frequency hopping is configured by using the higher layer parameter, the frequency hopping between the transmission occasions (repetitions) (also referred to as inter-multi-segment transmission frequency hopping, inter-transmission occasion frequency hopping, or the like) may be applied to the multi-segment transmission.

Alternatively, when the intra-slot frequency hopping is configured by using the higher layer parameter, the inter-multi-segment transmission frequency hopping may be applied to the multi-segment transmission. Alternatively, when the inter-multi-segment transmission frequency hopping is configured by using the higher layer parameter apart from the inter-slot frequency hopping or the intra-inter-slot frequency hopping, the inter-multi-segment transmission frequency hopping may be applied to the multi-segment transmission.

In the second frequency hopping procedure, the frequency hopping can be performed between transmission occasions in both of the multi-segment transmission and the single segment transmission.

Modification Examples

In the first or second frequency hopping procedure, the first or second repeated transmission according to the second aspect may be combined. Specifically, as described in the first repeated transmission (for example, FIG. 7A) according to the second aspect, FIGS. 8 to 10 described above illustrate a case in which the UE assumes that X times of the multi-segment transmission are repeated over the X' consecutive slots, X' being a number greater than the number X of times of repetition of the multi-segment transmission. However, the present invention is not limited to this case.

As described in the second repeated transmission (for example, FIG. 7B) according to the second aspect, the UE may cancel at least a part of the transmission of the multi-segment transmission in a slot exceeding the number X of times of repetition of the multi-segment transmission.

For example, in the multi-segment transmission shown in FIG. 8, the second segment in the fourth transmission occasion (transmission occasion indicated by j=4) belongs to a slot that exceeds the number of repetitions (=4) (the fifth slot from the slot in which the first transmission occasion starts). Thus, the UE may cancel the transmission of the second segment in the fourth transmission occasion (need not perform the transmission). In a similar manner, the UE may cancel the transmission of the second segment in the fourth transmission occasion in the multi-segment transmissions shown in FIGS. 9 and 10 as well (need not perform the transmission).

Note that it goes without saying that the time domain resource allocated to the PUSCH in each transmission occasion in FIGS. 8 to 10 described above can be determined by applying the first or second time domain resource determination described in the above first aspect.

As described above, according to the third aspect, the frequency hopping can be appropriately controlled also when the multi-segment transmission is performed with repetition.

(Fourth Aspect)

In the fourth aspect, the frequency hopping in the transmission occasion will be described. In the single segment transmission, the intra-slot frequency hopping (for example, FIG. 3B) can be applied in both of a case with repetition and a case of a single transmission without repetition. On the other hand, in the multi-segment transmission, a problem is how to control the frequency hopping in the transmission occasion (also referred to as intra-transmission occasion frequency hopping, intra-multi-segment transmission frequency hopping, or the like).

In the fourth aspect, the frequency hopping boundary in the intra-transmission occasion frequency hopping may be determined based on the number $N_{symb}$ of symbols allocated to the PUSCH (first frequency hopping boundary determination), or may be determined based on the slot boundary (second frequency hopping boundary determination).

Note that the intra-transmission occasion frequency hopping can be applied to both of the single segment transmission and the multi-segment transmission. The intra-transmission occasion frequency hopping can be applied to at least one of the case with repetition and case of a single transmission without repetition of the single segment transmission or the multi-segment transmission.

In the fourth aspect described below, the PUSCH will be mainly described. However, the present invention can be applied to other channels (for example, the PUSCH) as well as appropriate. In the description below, the dynamic grant-based PUSCH will be described. However, the present invention can be applied to the PUSCH based on the configuration grant of type 2 or the configuration grant of type 1 as well as appropriate.

<First Frequency Hopping Boundary Determination>

In the first frequency hopping boundary determination, the UE may determine the frequency hopping boundary (the number of symbols of each hop), based on the number $N_{symb}$ of symbols allocated to the PUSCH.

FIGS. 11A and 11B are each a diagram to show an example of the first frequency hopping boundary determination according to the fourth aspect. In FIGS. 11A and 11B, difference from FIG. 3B will be mainly described. The offset $RB_{OFFSET}$ may be determined based on at least one of the higher layer parameter and a value of a given field in the DCI. Note that FIGS. 11A and 11B are merely an example, and the start RB of each hop is not limited to those shown in the figures.

As shown in FIG. 11A, in a case of the single segment transmission, the UE may determine the frequency hopping boundary in a given transmission occasion, based on the number $N_{symb}$ of symbols allocated to the PUSCH.

As shown in FIG. 11B, in a case of the multi-segment transmission, the UE may determine the frequency hopping boundary in a given transmission occasion, based on the number $N_{symb}$ of symbols allocated to the PUSCH.

For example, in FIGS. 11A and 11B, the UE determines the number of symbols of the first hop according to floor$(N_{symb}/2)$, and determines the number of symbols of the second hop according to $N_{symb}$−floor$(N_{symb}/2)$. Note that the number of symbols of each hop is not limited to being determined according to the expressions shown above.

In FIGS. 11A and 11B, the UE may determine the index of the start symbol of the PUSCH, based on the reference timing value S' (the first time domain resource determination), or may determine the index, based on the index of the unit including a plurality of consecutive symbols (the second time domain resource determination). As described above, the first frequency hopping boundary determination can be applied in combination with the first aspect.

In the first frequency hopping boundary determination, as shown in FIGS. 11A and 11B, the number of symbols of each hop (in other words, the frequency hopping boundary) can be determined so as to be shared by the single segment transmission and the multi-segment transmission.

<Second Frequency Hopping Boundary Determination>

In the second frequency hopping boundary determination, the UE may determine the frequency hopping boundary (the number of symbols of each hop), based on the slot boundary in the transmission occasion of the PUSCH.

Figure 12A:
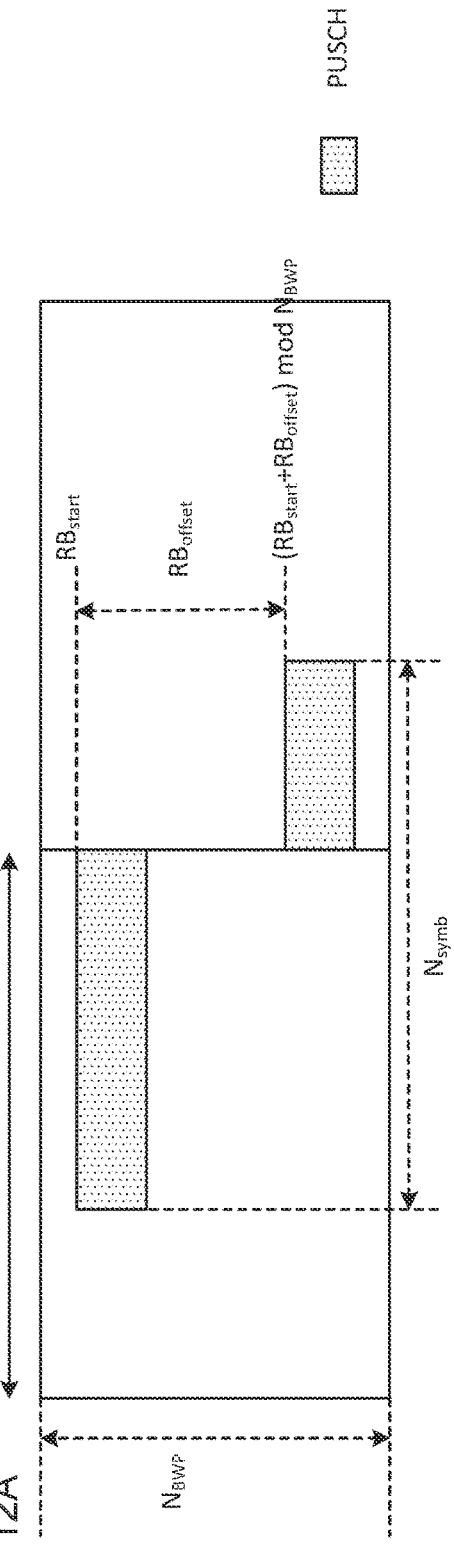
FIGS. 12A and 12B are each a diagram to show an example of second frequency hopping boundary determination according to the fourth aspect.
Figure 12B:
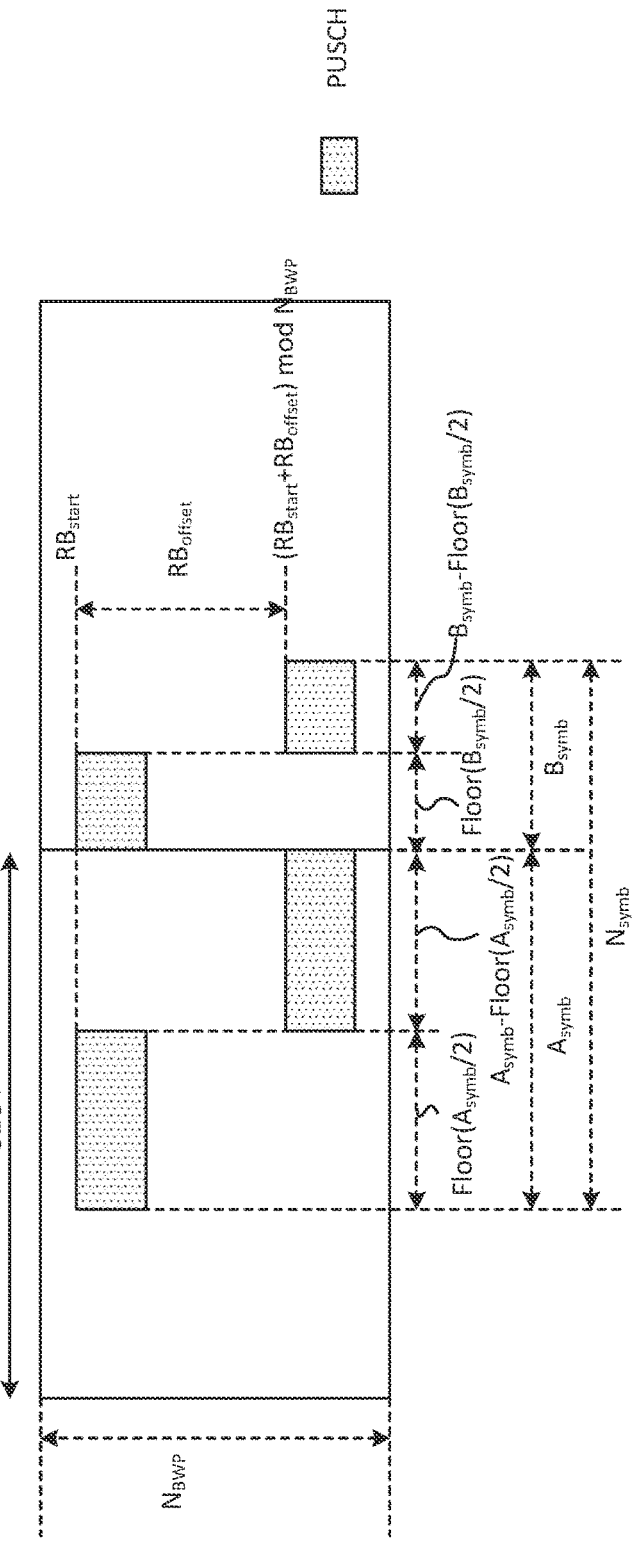

FIGS. 12A and 12B are each a diagram to show an example of the second frequency hopping boundary determination according to the fourth aspect. In FIGS. 12A and 12B, difference from FIG. 11B will be mainly described. Note that FIGS. 12A and 12B are merely an example, and the start RB of each hop is not limited to those shown in the figures.

As shown in FIG. 12A, in a case of the multi-segment transmission, the UE may determine the slot boundary in a given transmission occasion as the frequency hopping boundary in the transmission occasion.

As shown in FIG. 12B, in a case of the multi-segment transmission, the UE may determine the frequency hopping boundary in the transmission occasion, based on the slot boundary in the given transmission occasion and the number of symbols of each segment.

Specifically, in FIG. 12B, the UE may determine the frequency hopping boundary in the first segment, based on the number $A_{symb}$ of symbols of the first segment. For example, in FIG. 12B, the UE determines the number of symbols of the first hop of the first segment according to floor$(A_{symb}/2)$, and determines the number of symbols of the second hop of the first segment according to $A_{symb}$−floor$(A_{symb}/2)$.

In FIG. 12B, the UE may determine the frequency hopping boundary in the second segment, based on the number $B_{symb}$ of symbols of the second segment. For example, in FIG. 12B, the UE determines the number of symbols of the first hop of the second segment according to floor($B_{symb}/2$), and determines the number of symbols of the second hop of the first segment according to $B_{symb}$−floor($B_{symb}/2$). Note that the number of symbols of each hop of each segment is not limited to being determined according to the expressions shown above.

As shown in FIG. 12B, the offset $RB_{offset}$ between hops may be the same between segments, or may be different for each individual segment. In the latter case, the offset $RB_{offset}$ may be specified based on the higher layer parameter and the given field value in the DCI for each individual segment.

In FIGS. 12A and 12B, the UE may determine the index of the start symbol of the PUSCH, based on the reference timing value S' (the first time domain resource determination), or may determine the index, based on the index of the unit including a plurality of consecutive symbols (the second time domain resource determination). As described above, the second frequency hopping boundary determination can be applied in combination with the first aspect.

In the second frequency hopping boundary determination, as shown in FIGS. 12A and 12B, the number of symbols of each hop (in other words, the frequency hopping boundary) can be appropriately determined, based on the slot boundary in the transmission occasion.

As described above, according to the fourth aspect, the intra-transmission occasion frequency hopping can be appropriately controlled.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 13:
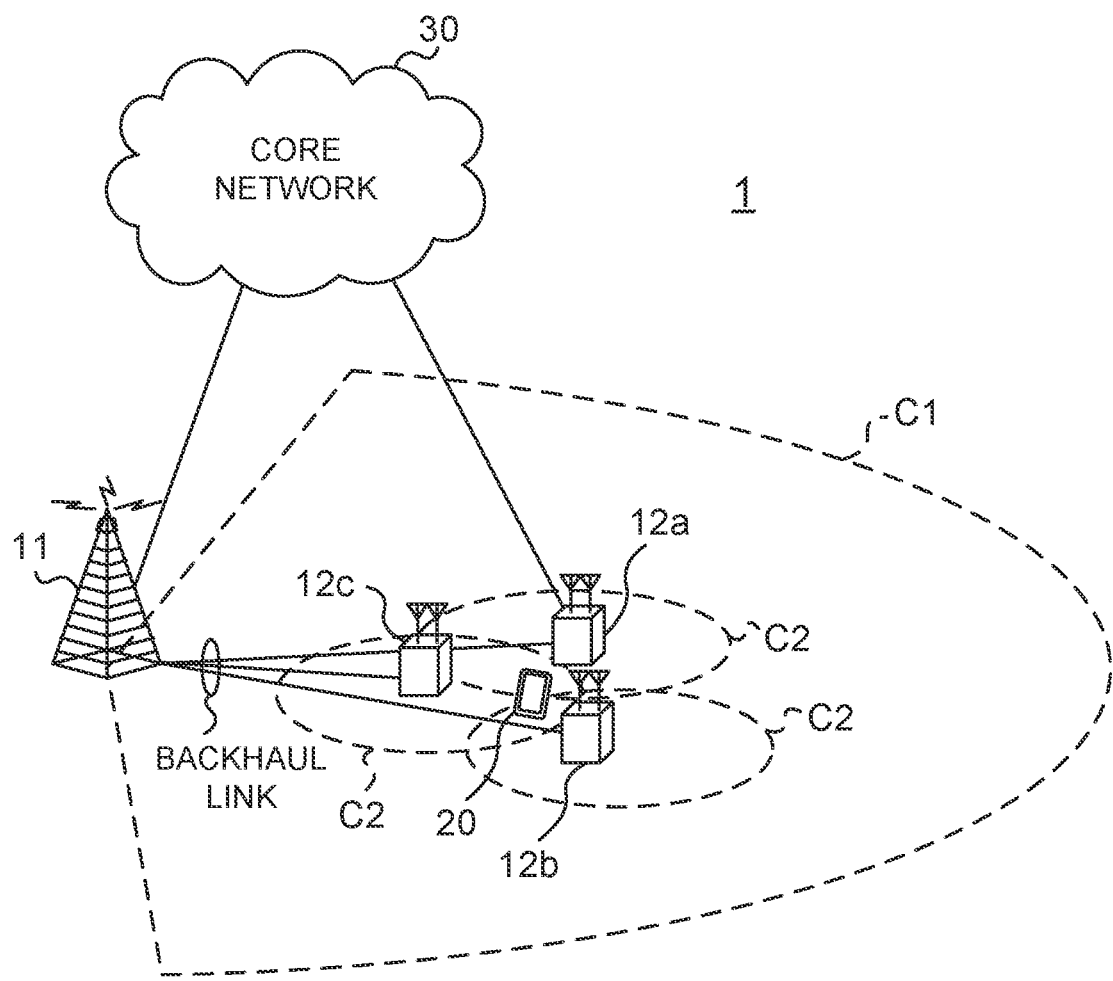
FIG. 13 is a diagram to show an example of a schematic structure of a radio communication system according to one embodiment.

FIG. 13 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 14:
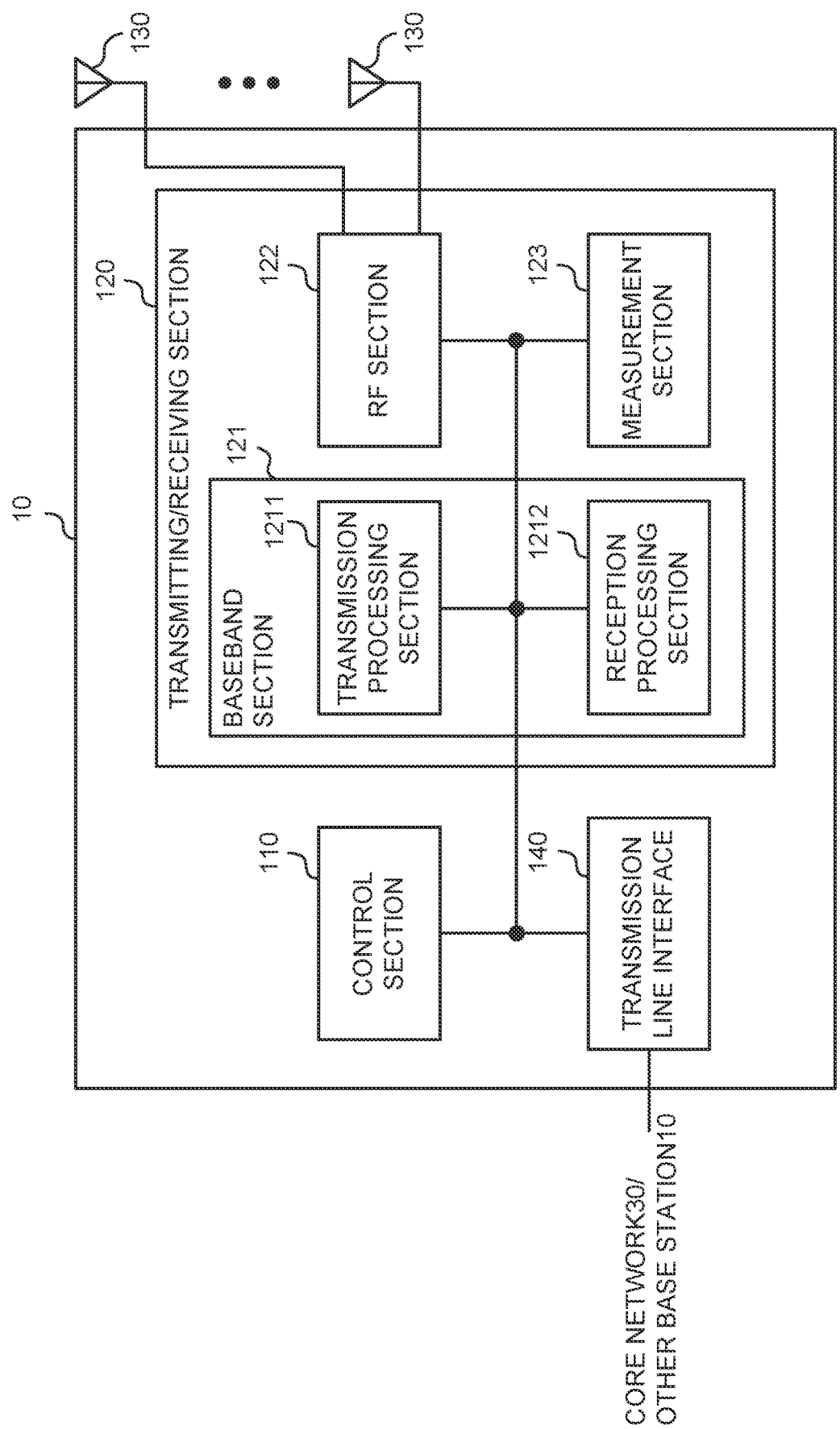
FIG. 14 is a diagram to show an example of a structure of a base station according to one embodiment.

FIG. 14 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RPM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

Note that the transmitting/receiving section 120 may transmit information related to timing being used as a reference of the start symbol of the uplink shared channel or the downlink shared channel in a given transmission occasion (first time domain resource determination according to the first aspect).

The information related to the timing may be a value of a given field in the downlink control information used for scheduling of the uplink shared channel or the downlink shared channel. The value of the given field may indicate a value indicating the timing.

A plurality of candidate values indicating the timing may be defined in a specification in advance, or may be configured by using a higher layer parameter. The value of the given field in the downlink control information may indicate one of the plurality of candidate values.

The control section 110 may determine a time domain resource over one or more slots allocated to the uplink shared channel or the downlink shared channel, based on the start symbol determined with the timing being used as the reference and the number of consecutive symbols from the start symbol (first time domain resource determination according to the first aspect). The control section 110 may control transmission of the downlink control information including a given field value used for determination of the start symbol and the number of symbols.

The transmitting/receiving section 120 may transmit information related to an index of the start unit and the number of consecutive units from the start unit of the uplink shared channel or the downlink shared channel in a given transmission occasion when the index is assigned to each unit including a plurality of symbols in a plurality of consecutive slots (second time domain resource determination according to the first aspect).

The information related to the index of the start unit and the number of units may be a value of a given field in the downlink control information used for scheduling of the uplink shared channel or the downlink shared channel.

The control section 110 may determine a time domain resource over one or more slots allocated to the uplink shared channel or the downlink shared channel, based on the start unit and the number of units (second time domain resource determination according to the first aspect).

The transmitting/receiving section 120 may transmit information related to the number of times of repetition of the uplink shared channel or the downlink shared channel (second aspect).

The control section 110 may control reception of the uplink shared channel or transmission of the downlink shared channel in a slot later than consecutive slots whose number is equal to the number of times of the repetition when the uplink shared channel or the downlink shared channel is transmitted or received in transmission occasions whose number is equal to the number of times of the repetition (second aspect).

The control section 110 may continue the reception of the uplink shared channel or the transmission of the downlink shared channel even in the slot later than the consecutive slots (first repeated transmission according to the second aspect).

The control section 110 may cancel the reception of the uplink shared channel or the transmission of the downlink shared channel even in the slot later than the consecutive slots (second repeated transmission according to the second aspect).

The control section 110 may control the frequency hopping of the uplink shared channel or the downlink shared channel in each of the transmission occasions, based on the slot boundary in each of the transmission occasions (first frequency hopping procedure according to the third aspect).

The pattern of the frequency hopping may be the same between the transmission occasions whose number is equal to the number of times of the repetition (for example, FIG. 8), or may be different between at least parts of the transmission occasions (for example, FIG. 9).

The control section 210 may control the frequency hopping of the uplink shared channel or the downlink shared channel between the transmission occasions whose number is equal to the number of times of the repetition (second frequency hopping procedure according to the third aspect).

The transmitting/receiving section 120 may transmit the uplink shared channel or transmit the downlink shared channel in the given transmission occasion (fourth aspect).

The control section 110 may determine the boundary (number of symbols of each hop in the given transmission occasion) of the frequency hopping in the given transmission occasion, based on the number of symbols allocated to the uplink shared channel or the downlink shared channel (first frequency hopping boundary determination according to the fourth aspect). The control section 110 may determine the boundary of the frequency hopping, regardless of the slot boundary in the given transmission occasion.

The control section 110 may determine the boundary of the frequency hopping in the given transmission occasion, based on the slot boundary in the given transmission occasion (second frequency hopping boundary determination according to the fourth aspect). The control section 110 may control the frequency hopping between slots in the given transmission occasion (for example, FIG. 12A).

The control section 110 may control the frequency hopping in each slot in the given transmission occasion (for example, FIG. 12B). The control section 210 may determine the boundary (number of symbols of each hop in each slot in the given transmission occasion) of the frequency hopping in the each slot, based on the number of symbols in the each slot in the given transmission occasion.

(User Terminal)

Figure 15:
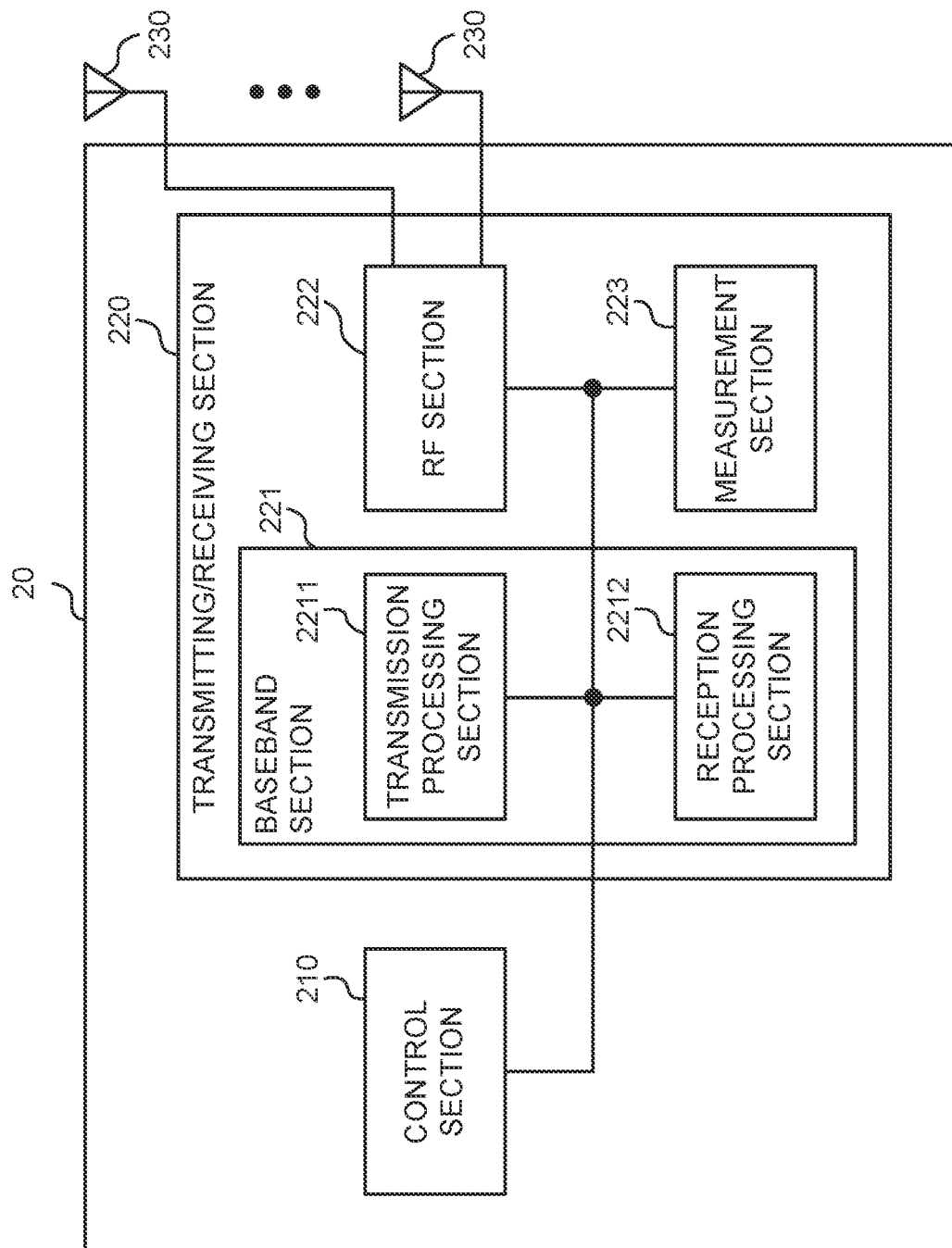
FIG. 15 is a diagram to show an example of a structure of a user terminal according to one embodiment.

FIG. 15 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the transmission line interface 240.

Note that the transmitting/receiving section 220 may receive information related to timing being used as a reference of the start symbol of the uplink shared channel or the downlink shared channel in a given transmission occasion (first time domain resource determination according to the first aspect).

The information related to the timing may be a value of a given field in the downlink control information used for scheduling of the uplink shared channel or the downlink shared channel. The value of the given field may indicate a value indicating the timing.

A plurality of candidate values indicating the timing may be defined in a specification in advance, or may be configured by using a higher layer parameter. The value of the given field in the downlink control information may indicate one of the plurality of candidate values.

The control section 210 may determine a time domain resource over one or more slots allocated to the uplink shared channel or the downlink shared channel, based on the start symbol determined with the timing being used as the reference and the number of consecutive symbols from the start symbol (first time domain resource determination according to the first aspect). The control section 210 may determine the start symbol and the number of consecutive symbols, based on the value of the given field in the downlink control information.

The transmitting/receiving section 220 may receive information related to an index of the start unit and the number of consecutive units from the start unit of the uplink shared channel or the downlink shared channel in a given transmission occasion when the index is assigned to each unit including a plurality of symbols in a plurality of consecutive slots (second time domain resource determination according to the first aspect).

The information related to the index of the start unit and the number of units may be a value of a given field in the downlink control information used for scheduling of the uplink shared channel or the downlink shared channel.

The control section 210 may determine a time domain resource over one or more slots allocated to the uplink shared channel or the downlink shared channel, based on the start unit and the number of units (second time domain resource determination according to the first aspect).

The transmitting/receiving section 220 may receive information related to the number of times of repetition of the uplink shared channel or the downlink shared channel (second aspect).

The control section 210 may control transmission of the uplink shared channel or reception of the downlink shared channel in a slot later than consecutive slots whose number is equal to the number of times of the repetition when the uplink shared channel or the downlink shared channel is transmitted or received in transmission occasions whose number is equal to the number of times of the repetition (second aspect).

The control section 210 may continue the transmission of the uplink shared channel or the reception of the downlink shared channel even in the slot later than the consecutive slots (first repeated transmission according to the second aspect).

The control section 210 may cancel the transmission of the uplink shared channel or the reception of the downlink shared channel even in the slot later than the consecutive slots (second repeated transmission according to the second aspect).

The control section 210 may control the frequency hopping of the uplink shared channel or the downlink shared channel in each of the transmission occasions, based on the slot boundary in each of the transmission occasions (first frequency hopping procedure according to the third aspect).

The pattern of the frequency hopping may be the same between the transmission occasions whose number is equal to the number of times of the repetition (for example, FIG. 8), or may be different between at least parts of the transmission occasions (for example, FIG. 9).

The control section 210 may control the frequency hopping of the uplink shared channel or the downlink shared channel between the transmission occasions whose number is equal to the number of times of the repetition (second frequency hopping procedure according to the third aspect).

The transmitting/receiving section 220 may transmit the uplink shared channel or receive the downlink shared channel in the given transmission occasion (fourth aspect).

The control section 210 may determine the boundary (number of symbols of each hop in the given transmission occasion) of the frequency hopping in the given transmission occasion, based on the number of symbols allocated to the uplink shared channel or the downlink shared channel (first frequency hopping boundary determination according to the fourth aspect). The control section 210 may determine the boundary of the frequency hopping, regardless of the slot boundary in the given transmission occasion.

The control section 210 may determine the boundary of the frequency hopping in the given transmission occasion, based on the slot boundary in the given transmission occasion (second frequency hopping boundary determination according to the fourth aspect). The control section 210 may control the frequency hopping between slots in the given transmission occasion (for example, FIG. 12A).

The control section 210 may control the frequency hopping in each slot in the given transmission occasion (for example, FIG. 12B). The control section 210 may determine the boundary (number of symbols of each hop in each slot in the given transmission occasion) of the frequency hopping in the each slot, based on the number of symbols in the each slot in the given transmission occasion.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 16:
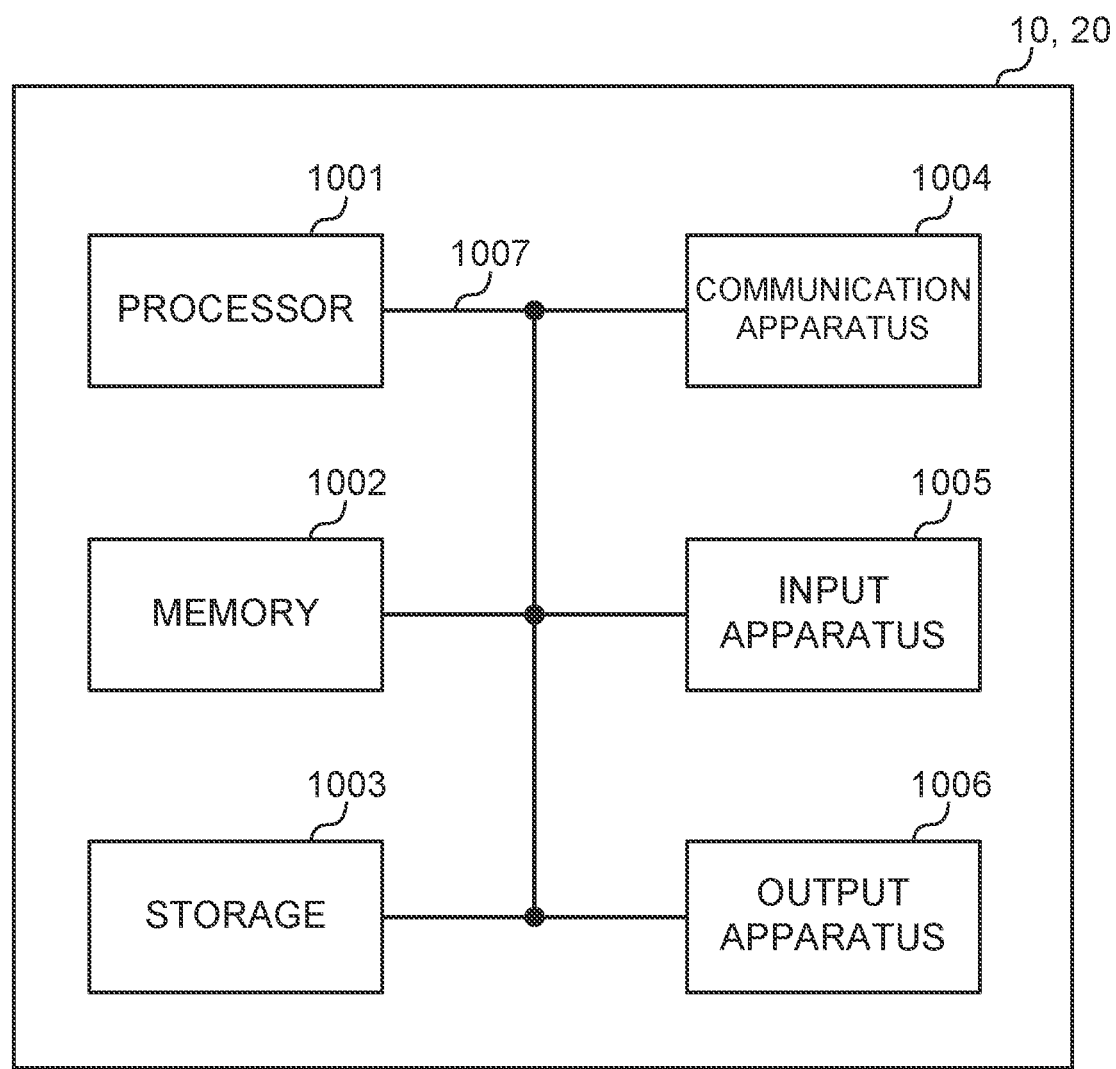
FIG. 16 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 16 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding wait)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal,"

"wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMA. (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other."

Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
    a receiver that receives information regarding a number of repetitions of a physical uplink shared channel (PUSCH);
    a transmitter that transmits the PUSCH in a same number of transmission occasions as a number of repetitions indicated by the information; and
    a processor that applies, based on a slot boundary within the transmission occasions across the slot boundary, frequency hopping to the PUSCH in the transmission occasions,
    wherein a pattern of the frequency hopping differs among at least a part of the same number of transmission occasions as the number of repetitions.

2. A radio communication method for a terminal, comprising:
    receiving information regarding a number of repetitions of a physical uplink shared channel (PUSCH);
    transmitting the PUSCH in a same number of transmission occasions as a number of repetitions indicated by the information; and
    applying, based on a slot boundary within the transmission occasions across the slot boundary, frequency hopping to the PUSCH in the transmission occasions,
    wherein a pattern of the frequency hopping differs among at least a part of the same number of transmission occasions as the number of repetitions.

3. A system comprising a terminal and a base station, wherein the terminal comprises:
    a first receiver that receives information regarding a number of repetitions of a physical uplink shared channel (PUSCH);
    a first transmitter that transmits the PUSCH in a same number of transmission occasions as a number of repetitions indicated by the information; and
    a processor that applies, based on a slot boundary within the transmission occasions across the slot boundary, frequency hopping to the PUSCH in the transmission occasions,
    wherein a pattern of the frequency hopping differs among at least a part of the same number of transmission occasions as the number of repetitions, and
    the base station comprises:
    a second transmitter that transmits the information; and
    a second receiver that receives the PUSCH.

* * * * *